United States Patent
Hwang et al.

(10) Patent No.: US 7,457,372 B2
(45) Date of Patent: Nov. 25, 2008

(54) DATA TRANSMISSION/RECEPTION APPARATUS AND METHOD FOR ACHIEVING BOTH MULTIPLEXING GAIN AND DIVERSITY GAIN IN A MOBILE COMMUNICATION SYSTEM USING SPACE-TIME TRELLIS CODE

(75) Inventors: Chan-Soo Hwang, Yongin-shi (KR);
Yung-Soo Kim, Songnam-shi (KR);
Seung-Hoon Nam, Seoul (KR);
Jae-Hak Chung, Seoul (KR)

(73) Assignee: Samsung Electronics Co., Ltd (KR)

( * ) Notice: Subject to any disclaimer, the term of this patent is extended or adjusted under 35 U.S.C. 154(b) by 687 days.

(21) Appl. No.: 10/695,493

(22) Filed: Oct. 28, 2003

(65) Prior Publication Data
US 2004/0136465 A1 Jul. 15, 2004

(30) Foreign Application Priority Data
Jan. 9, 2003 (KR) .................. 10-2003-0001452

(51) Int. Cl.
*H04L 27/04* (2006.01)
*H04B 1/69* (2006.01)
(52) U.S. Cl. ..................... 375/299; 375/146
(58) Field of Classification Search ........... 375/146, 375/295, 299, 130
See application file for complete search history.

(56) References Cited

U.S. PATENT DOCUMENTS

| 2003/0002518 A1* | 1/2003 | Shibutani | 370/442 |
| 2004/0136465 A1* | 7/2004 | Hwang et al. | 375/267 |
| 2004/0156328 A1* | 8/2004 | Walton et al. | 370/313 |

FOREIGN PATENT DOCUMENTS

JP 2000-004215 1/2000

(Continued)

OTHER PUBLICATIONS

Kim et al., "A new soft handover scheme using punctured turbo codes in the wideband CDMA system" IEEE Vehicular Technology Conference, 2001 Spring, pp. 1420-1424.*

(Continued)

*Primary Examiner*—Khai Tran
(74) *Attorney, Agent, or Firm*—The Farrell Law Firm, PC

(57) ABSTRACT

A mobile communication system includes at least three transmission antennas of first to third transmission antennas, and uses an overlapped antenna scheme for grouping the first and second transmission antennas into a first transmission antenna group and grouping the second and third transmission antennas into a second transmission antenna group. First and second modulators modulate L information bit streams to be transmitted through the first transmission antenna group and output first and second modulation symbol streams. Third and fourth modulators modulate L other information bit streams to be transmitted through the second transmission antenna group and output third and fourth symbol streams. First to fourth puncturers puncture at least one modulation symbol in a predetermined position among the first to fourth modulation symbol streams. A multiplexer transmits a modulation symbol stream output from the first puncturer through the first transmission antenna, transmits modulation symbol streams output from the second and third puncturers through the second transmission antenna after summation, and transmits a modulation symbol stream output from the third puncturer through the third transmission antenna.

14 Claims, 12 Drawing Sheets

FOREIGN PATENT DOCUMENTS

| WO | WO 01/50671 | * | 7/2001 |
| WO | WO 02/28043 | * | 4/2002 |
| WO | WO 02/103926 | * | 12/2002 |

OTHER PUBLICATIONS

Vahid Tarokh et al., "Space-Time Codes for High data Rate Wireless Communication: Performance Criterion and Code Construction", IEEE Transactions on Information Theory, vol. 44, No. 2, Mar. 1998, pp. 744-765.

Vahid Tarokh et al., "Combined Array Processing and Space-Time Coding", IEEE Transactions on Information Theory, vol. 45, No. 4, May 1999, pp. 1121-1128.

* cited by examiner

DATA TRANSMISSION/RECEPTION APPARATUS AND METHOD FOR ACHIEVING BOTH MULTIPLEXING GAIN AND DIVERSITY GAIN IN A MOBILE COMMUNICATION SYSTEM USING SPACE-TIME TRELLIS CODE

PRIORITY

This application claims priority under 35 U.S.C. § 119 to an application entitled "Data Transmission/Reception Apparatus and Method for Achieving Both Multiplexing Gain and Diversity Gain in a Mobile Communication System Using Space-Time Trellis Code" filed in the Korean Intellectual Property Office on Jan. 9, 2003 and assigned Ser. No. 2003-1452, the contents of which are incorporated herein by reference.

BACKGROUND OF THE INVENTION

1. Field of the Invention

The present invention relates generally to a mobile communication system, and in particular, to a data transmission/reception apparatus and method for achieving both multiplexing gain and diversity gain in a mobile communication system using a space-time trellis code (hereinafter referred to as "STTC").

2. Description of the Related Art

With the rapid development of mobile communication systems, the amount of data serviced by the mobile communication system has also increased. Recently, a $3^{rd}$ generation mobile communication system for transmitting high-speed data has been developed. For the $3^{rd}$ generation mobile communication system, Europe has adopted an asynchronous wideband-code division multiple access (hereinafter referred to as "W-CDMA") system as its radio access standard, while North America has adopted a synchronous code division multiple access-2000 (hereinafter referred to as "CDMA-2000") system as its radio access standard. Generally, in these mobile communication systems, a plurality mobile stations (MSs) communicate with each other via a common base station (BS). However, during high-speed data transmission in the mobile communication system, a phase of a received signal may be distorted due to a fading phenomenon occurring on a radio channel. The fading reduces amplitude of a received signal by several dB to several tens of dB. If a phase of a received signal distorted due to the fading phenomenon is not compensated for during data demodulation, the phase distortion becomes a cause of information error of transmission data transmitted by a transmission side, causing a reduction in the quality of a mobile communication service. Therefore, in mobile communication systems, fading must be overcome in order to transmit high-speed data without a decrease in the service quality, and several diversity techniques are used in order to cope with the fading.

Generally, a CDMA system adopts a rake receiver that performs diversity reception by using delay spread of a channel. While the rake receiver applies reception diversity for receiving a multipath signal, a rake receiver applying the diversity technique using the delay spread is disadvantageous in that it does not operate when the delay spread is less than a preset value. In addition, a time diversity technique using interleaving and coding is used in a Doppler spread channel. However, the time diversity technique is disadvantageous in that it can hardly be used in a low-speed Doppler spread channel.

Therefore, in order to cope with fading, a space diversity technique is used in a channel with low delay spread, such as an indoor channel, and a channel with low-speed Doppler spread, such as a pedestrian channel. The space diversity technique uses two or more transmission/reception antennas. In this technique, when a signal transmitted via one transmission antenna decreases in its signal power due to fading, a signal transmitted via the other transmission antenna is received. The space diversity can be classified into a reception antenna diversity technique using a reception antenna and a transmission diversity technique using a transmission antenna. However, since the reception antenna diversity technique is applied to a mobile station, it is difficult to install a plurality of antennas in the mobile station in view of the mobile station's size and its installation cost. Therefore, it is recommended that the transmission diversity technique should be used in which a plurality of transmission antennas are installed in a base station.

Particularly, in a $4^{th}$ generation mobile communication system, a data rate of about 10 Mbps to 150 Mbps is expected, and an error rate requires a bit error rate (hereinafter referred to as "BER") of $10^{-3}$ for voice, BER of $10^{-6}$ for data, and BER of $10^{-9}$ for image. The STTC is a combination of a multi-antenna technique and a channel coding technique, and is a technique bringing a drastic improvement of a data rate and reliability in a radio MIMO (Multi Input Multi Output) channel. The STTC obtains the receiver's space-time diversity gain by extending the space-time dimension of a transmitter's transmission signal. In addition, the STTC can obtain coding gain without a supplemental bandwidth, contributing to an improvement in channel capacity.

Therefore, in the transmission diversity technique, the STTC is used. When the STTC is used, coding gain having an effect of increasing transmission power is obtained together with diversity gain which is equivalent to a reduction in channel gain occurring due to a fading channel when the multiple transmission antennas are used. A method for transmitting a signal using the STTC is disclosed in Vahid Tarokh, N. Seshadri, and A. Calderbank, "Space Time Codes For High Data Rate Wireless Communication: Performance Criterion And Code Construction," IEEE Trans. on Info. Theory, pp. 744-765, Vol. 44, No. 2, March 1998. In this reference, it is provided that if a code rate is defined as the number of symbols transmitted for a unit time, the code rate must be smaller than 1 in order to obtain diversity gain corresponding to the product of the number of transmission antennas and the number of reception antennas.

FIG. 1 is a block diagram schematically illustrating a general structure of a transmitter using STTC. Referring to FIG. 1, when L information data bits $d_1, d_2, d_3, \ldots, d_L$ are input to the transmitter, the input information data bits $d_1, d_2, d_3, \ldots, d_L$ are provided to a serial-to-parallel (S/P) converter 111. Here, the index L represents the number of information data bits to be transmitted by the transmitter for a unit transmission time, and the unit transmission time can become a symbol unit. The S/P converter 111 parallel-converts the information data bits $d_1, d_2, d_3, \ldots, d_L$ and provides its outputs to first to $L^{th}$ encoders 121-1 to 121-L. That is, the S/P converter 111 provides a parallel-converted information data bit $d_1$, to the first encoder 121-1, and in this manner, provides a parallel-converted information data bit $d_L$ to the $L^{th}$ encoder 121-L. The first to $L^{th}$ encoders 121-1 to 121-L each encode signals output from the S/P converter 111 in a predetermined encoding scheme, and then each provide their outputs to first to $M^{th}$ modulators 131-1 to 131-M. Here, the index M represents the number of transmission antennas included in the transmitter, and the predetermined encoding scheme is an STTC encoding scheme. A detailed structure of the first to $L^{th}$ encoders 121-1 to 121-L will be described later with reference to FIG. 2.

The first to $M^{th}$ modulators 131-1 to 131-M each modulate signals received from the first to $L^{th}$ encoders 121-1 to 121-L in a predetermined modulation scheme. The first to $M^{th}$ modulators 131-1 to 131-M are similar to one another in operation except the signals applied thereto. Therefore, only the first modulator 131-1 will be described herein. The first modulator 131-1 adds up signals received from the first to $L^{th}$ encoders 121-1 to 121-L, multiplies the addition result by a gain applied to a transmission antenna to which the first modulator 131-1 is connected, i.e., a first transmission antenna ANT#1, modulates the multiplication result in a predetermined modulation scheme, and provides the modulation result to the first transmission antenna ANT#1. Here, the modulation scheme includes BPSK (Binary Phase Shift Keying), QPSK (Quadrature Phase Shift Keying), QAM (Quadrature Amplitude Modulation), PAM (Pulse Amplitude Modulation), and PSK (Phase Shift Keying). It will be assumed in FIG. 1 that since the number of encoders is L, $2^L$-ary QAM is used as a modulation scheme. The first to $M^{th}$ modulators 131-1 to 131-M provide their modulation symbols $S_1$ to $S_M$ to first to $M^{th}$ transmission antennas ANT#1 to ANT#M, respectively. The first to $M^{th}$ transmission antennas ANT#1 to ANT#M transmit to the air the modulation symbols $S_1$ to $S_M$ output from the first to $M^{th}$ modulators 131-1 to 131-M.

FIG. 2 is a block diagram illustrating a detailed structure of the first to $L^{th}$ encoders 121-1 to 121-L of FIG. 1. For simplicity, a description will be made of only the first encoder 121-1. The information data bit $d_1$ output from the S/P converter 111 is applied to the first encoder 121-1, and the first encoder 121-1 provides the information data bit $d_1$ to tapped delay lines, i.e., delays (D) 211-1, 211-2, . . . , 211-(K−1). Here, the number of the delays, or the tapped delay lines, is smaller by 1 than a constraint length K of the first encoder 121-1. The delays 211-1, 211-2, . . . , 211-(K−1) each delay their input signals. That is, the delay 211-1 delays the information data bit $d_1$ and provides its output to the delay 211-2, and the delay 211-2 delays an output signal of the delay 211-1. In addition, input signals provided to the delays 211-1, 211-2, . . . , 211-(K−1) are multiplied by predetermined gains, and then provided to modulo adders 221-1, . . . , 221-M, respectively. The number of the modulo adders is identical to the number of the transmission antennas. In FIG. 1, since the number of the transmission antennas is M, the number of the modulo adders is also M. Further, gains multiplied by the input signals of the delays 211-1, 211-2, . . . , 211-(K−1) are represented by $g_{i,j,t}$, where i denotes an encoder index, j an antenna index and t a memory index. In FIG. 1, since the number of encoders is L and the number of antennas is M, the encoder index i increases from 1 to L, the antenna index j increases from 1 to M, and the memory index K increases from 1 to the constraint length K. The modulo adders 221-1, . . . , 221-M each modulo-add signals obtained by multiplying the input signals of the corresponding delays 211-1, 211-2, . . . , 211-(K−1) by the gains. The STTC encoding scheme is also disclosed in Vahid Tarokh, N. Seshadri, and A. Calderbank, "Space Time Codes For High Data Rate Wireless Communication: Performance Criterion And Code Construction," IEEE Trans. on Info. Theory, pp. 744-765, Vol. 44, No. 2, March 1998.

FIG. 3 is a block diagram schematically illustrating a structure of an STTC transmitter having two encoders and 3 transmission antennas. Referring to FIG. 3, when 2 information data bits $d_1$ and $d_2$ are input to the transmitter, the input information data bits $d_1$ and $d_2$ are applied to an S/P converter 311. The S/P converter 311 parallel-converts the information data bits $d_1$ and $d_2$, and outputs the information data bit $d_1$ to a first encoder 321-1 and the information data bit $d_2$ to a second encoder 321-2. If it is assumed that the first encoder 321-1 has a constraint length K of 4 (constraint length K=4), an internal structure, illustrated in FIG. 2, of the first encoder 321-1 is comprised of 3 delays ($1+2D+D^3$) and 3 modulo adders, wherein the number of delays and modulo adders is equal to a value smaller by 1 than the constant length K=4. Therefore, in the first encoder 321-1, the undelayed information data bit $d_1$ applied to a first delay, a bit determined by multiplying a bit delayed once by the first delay by 2, and a bit delayed three times by a third delay are provided to a first modulo adder connected to a first modulator 331-1 of a first transmission antenna ANT#1. In this manner, outputs of the 3 modulo adders of the first encoder 321-1 are provided to the first modulator 331-1, a second modulator 331-2 and a third modulator 331-3, respectively. Similarly, the second encoder 321-2 encodes the information data bit $d_2$ output from the S/P converter 311 in the same encoding scheme as that used by the first encoder 321-1, and then, provides its outputs to the first modulator 331-1, the second modulator 331-2 and the third modulator 331-3.

The first modulator 331-1 modulates the signals output from the first encoder 321-1 and the second encoder 321-2 in a predetermined modulation scheme, and then provides its output to a first transmission antenna ANT#1. It is assumed herein that a modulation scheme applied to the transmitter is QPSK. Therefore, if an output signal of the first encoder 321-1 is $b_1$ and an output signal of the second encoder 321-2 is $b_2$, the first modulator 331-1 modulates the output signals in the QPSK modulation scheme, and outputs $b_1+b_2*j$, where j= $\sqrt{-1}$. Like the first modulator 331-1, the second modulator 331-2 and the third modulator 331-3 modulate output signals of the first encoder 321-1 and the second encoder 321-2 in the QPSK modulation scheme, and then, provide their outputs to a second transmission antenna ANT#2 and a third transmission antenna ANT#3, respectively. The first to third transmission antennas ANT#1 to ANT#3 transmit to the air the modulation symbols $S_1$ to $S_3$ output from the first to third modulators 331-1 to 331-3, respectively.

FIG. 4 is a block diagram schematically illustrating a receiver structure corresponding to the transmitter structure using the STTC described above in conjunction with FIG. 1. Referring to FIG. 4, a signal transmitted to the air by a transmitter is received through reception antennas of the receiver. It is assumed in FIG. 4 that there are provided N reception antennas. The N reception antennas each process signals received from the air. Specifically, a signal received through a first reception antenna ANT#1 is provided to a channel estimator 411 and a metric calculator 423. The channel estimator 411 performs channel estimation on signals output from the first to $N^{th}$ reception antennas ANT#1 to ANT#N, and then provides the channel estimation result to a hypothesis part 412.

A possible sequence generator 415 generates all kinds of sequences which were possibly simultaneously encoded for information data bits transmitted by the transmitter, and provides the generated sequences to first to $L^{th}$ encoders 417-1 to 417-L. Since the transmitter transmits information data by the L information bits, the possible sequence generator 415 generates possible sequences $\tilde{d}_1 \ldots \tilde{d}_L$ comprised of L bits. The L bits of the generated possible sequences are applied to the first to $L^{th}$ encoders 417-1 to 417-L, and the first to $L^{th}$ encoders 417-1 to 417-L encode their input bits in the STTC encoding scheme described in conjunction with FIG. 2, and then provide the encoded bits to first to $M^{th}$ modulators 419-1 to 419-M. The first to $M^{th}$ modulators 419-1 to 419-M each modulate the encoded bits output from the first to $L^{th}$ encoders 417-1 to 417-L in a predetermined modulation scheme, and provide their outputs to the hypothesis part 412. The modulation scheme applied in the first to $M^{th}$ modulators 419-1 to 419-M is set to any one of the BPSK, QPSK, QAM, PAM and PSK modulation schemes. Since a modulation scheme applied in the first to $M^{th}$ modulators 131-1 to 131-M of FIG. 1 is $2^L$-ary QAM, the first to $M^{th}$ modulators 419-1 to 419-M also modulate their input signals in the $2^L$-ary QAM modulation scheme.

The hypothesis part 412 receives signals output from the first to $M^{th}$ modulators 419-1 to 419-M and the channel estimation value output from the channel estimator 411, generates a hypothetic channel output at a time when a sequence consisting of the signals output from the first to $M^{th}$ modulators 419-1 to 419-M has passed a channel corresponding to the channel estimation result, and provides the generated hypothetic channel output to the metric calculator 423. The metric calculator 423 receives the hypothetic channel output provided from the hypothesis part 412 and the signals received through the first to $N^{th}$ reception antennas ANT#1 to ANT#N, and calculates a distance between the hypothetic channel output and the signals received through the first to $N^{th}$ reception antennas ANT#1 to ANT#N. The metric calculator 423 uses Euclidean distance when calculating the distance.

In this manner, the metric calculator 423 calculates Euclidean distance for all possible sequences the transmitter can transmit, and then provides the calculated Euclidean distance to a minimum distance selector 425. The minimum distance selector 425 selects a Euclidean distance having the minimum distance from Euclidean distances output from the metric calculator 423, determines information bits corresponding to the selected Euclidean distance as information bits transmitted by the transmitter, and provides the determined information bits to a parallel-to-serial (P/S) converter 427. Although there are several possible algorithms used when the minimum distance selector 425 determines information bits corresponding to the Euclidean distance having the minimum distance, it is assumed herein that a Viterbi algorithm is used. A process of extracting information bits having the minimum distance by using the Viterbi algorithm is disclosed in Vahid Tarokh, N. Seshadri, and A. Calderbank, "Space Time Codes For High Data Rate Wireless Communication: Performance Criterion And Code Construction," IEEE Trans. on Info. Theory, pp. 744-765, Vol. 44, No. 2, March 1998, so a detailed description thereof will not be provided for simplicity. Since the minimum distance selector 425 determines information bits corresponding to the Euclidean distance having the minimum distance for all sequences generated from the possible sequence generator 415, it finally outputs L information bits of $\hat{d}_1, \hat{d}_1, \ldots, \hat{d}_L$. The P/S converter 427 then serial-converts the L information bits output from the minimum distance selector 425, and outputs reception information data sequences $\hat{d}_1, \hat{d}_1, \ldots, \hat{d}_L$.

As described above, when the transmitter transmits a signal with a plurality of transmission antennas, the STTC can achieve coding gain having an effect of amplifying power of a received transmission signal, together with diversity gain, in order to prevent a reduction in channel gain occurring due to a fading channel. In Tarokh, it is provided that if a code rate is defined as the number of symbols transmitted for a unit time in a communication system using STTC, the code rate must be smaller than 1 in order to obtain diversity gain corresponding to the product of the number of transmission antennas and the number of reception antennas. That is, it is provided that if it is assumed that the number of information data bits in a symbol transmitted to the air through one transmission antenna at a particular transmission time is N, even though a transmitter uses a plurality of transmission antennas, the number of information data bits that can be transmitted to the air through the plural transmission antennas at a particular transmission time must be smaller than or equal to N in order to achieve diversity gain corresponding to the product of the number of transmission antennas and the number of reception antennas. The reason for providing that the number of information data bits that can be transmitted to the air through a plurality of transmission antennas should be smaller than or equal to N is to maintain diversity gain through the plural transmission antennas.

As mentioned above, a mobile communication system using STTC can achieve both the diversity gain and the coding gain, so the system is effective when using multiple antennas in a varying channel environment. However, since only one data stream is transmitted through multiple antennas, it is difficult to achieve multiplexing gain, which is equivalent to achieving gain in terms of a data rate. In order to solve this problem, there has been recently proposed a technique for applying multiplexing to multiple antennas before transmission in a transmitter in order to maximize a multiplexing gain, i.e., a data rate. In a technique for applying channel coding to the multiple antennas, a transmitter transmits a plurality of data streams through plural transmission antennas, thereby achieving both diversity gain and multiplexing gain.

Meanwhile, in a technique for applying STTC to the multiple antennas, if the number of transmission antennas of a transmitter is 3 and the number of reception antennas of a receiver is 3, it is possible in theory to obtain 9-level diversity gain. However, in practice in an actual mobile communication system, diversity gain of over 4 levels does not affect improvement in system performance, so there is a limitation on improvement in system performance. In a technique proposed to make up for the defects that result in system performance which cannot be improved further even though high-level diversity gain can be actually obtained, when the number of transmission antennas of a transmitter is larger than or equal to a predetermined number, the transmission antennas are classified into several groups for signal transmission. The technique for classifying the transmission antennas into several groups for signal transmission is called "combined array processing and diversity." The combined array processing and diversity technique is disclosed in Vahid Tarokh, A. Naguib, N. Seshadri, and A. Calderbank, "Combined Array Processing And Space Time Coding." IEEE Trans. Inform. Theory, Vol. 45, pp. 1121-1128, May 1999.

FIG. 5 is a block diagram schematically illustrating a general structure of an STTC transmitter using the combined array processing and diversity technique. Referring to FIG. 5, the transmitter includes M transmission antennas, and classifies the M transmission antennas into P groups. That is, $M_P$ transmission antennas constitute one group, and each group performs the transmission operation, i.e., encoding and modulation operations, described in conjunction with FIG. 1. Here, the sum of $M_1$ to $M_P$ is M. The combined array processing and diversity technique will now be described with reference to a first transmission antenna group and a $P^{th}$ transmission antenna group among the P transmission antenna groups.

First, the first transmission antenna group will be described. If L information data bits $d_{11}, d_{21}, d_{31}, \ldots, d_{L1}$ are input to a transmitter of the first transmission antenna group, the input information data bits $d_{11}, d_{21}, d_{31}, \ldots, d_{L1}$ are provided to an S/P converter 511. Here, the index L represents the number of information data bits to be transmitted by the transmitter of the first transmission antenna group for a unit transmission time, and the unit transmission time can become a symbol unit. In addition, the index "1" succeeding the index L represents the first transmission antenna group. The S/P converter 511 parallel-converts the information data bits $d_{11}$, $d_{21}$, $d_{31}$, ..., $d_{L1}$ and provides its outputs to first to $L_1^{th}$ encoders 521-1 to 521-$L_1$. That is, the S/P converter 511 provides a parallel-converted information data bit $d_{11}$ to the first encoder 521-1, and in this manner, provides a parallel-converted information data bit $d_{L1}$ to the $L_1^{th}$ encoder 521-$L_1$. The first to $L_1^{th}$ encoders 521-1 to 521-$L_1$ each encode signals output from the S/P converter 511 in a predetermined encoding scheme, and then provide their outputs to first to $M_1^{th}$ modulators 531-1 to 531-$M_1$. Here, the index $M_1$ represents the number of transmission antennas included in the transmitter of the first transmission antenna group, and the predetermined encoding scheme is an STTC encoding scheme.

The first to $M_1^{th}$ modulators 531-1 to 531-$M_1$ each modulate signals received from the first to $L_1^{th}$ encoders 521-1 to 521-$L_1$ in a predetermined modulation scheme. The first to $M_1^{th}$ modulators 531-1 to 531-$M_1$ provide modulation symbols $S_1$ to $S_{M1}$ to first to $M_1^{th}$ transmission antennas ANT#1 to ANT#$M_1$, respectively. The first to $M_1^{th}$ transmission antennas ANT#1 to ANT#$M_1$ transmit to the air the modulation symbols $S_1$ to $S_{M1}$ output from the first to $M_1^{th}$ modulators 531-1 to 531-$M_1$.

Second, the $P^{th}$ transmission antenna group will be described. If L information data bits $d_{1P}$, $d_{2P}$, $d_{3P}$, ..., $d_{LP}$ are input to a transmitter of the $P^{th}$ transmission antenna group, the input information data bits $d_{1P}$, $d_{2P}$, $d_{3P}$, ..., $d_{LP}$ are provided to an S/P converter 551. Here, the index "P" succeeding the index L represents the $P^{th}$ transmission antenna group. The S/P converter 551 parallel-converts the information data bits $d_{1P}$, $d_{2P}$, $d_{3P}$, ..., $d_{LP}$ and provides its outputs to first to $L_P^{th}$ encoders 561-1 to 561-$L_P$. That is, the S/P converter 551 provides a parallel-converted information data bit $d_{1P}$ to the first encoder 561-1, and in this manner, provides a parallel-converted information data bit $d_{LP}$ to the $L_P^{th}$ encoder 561-$L_P$. The first to $L_P^{th}$ encoders 561-1 to 561-$L_P$ each encode signals output from the S/P converter 551 in a predetermined encoding scheme, and then provide their outputs to first to $M_P^{th}$ modulators 571-1 to 571-$M_P$. Here, the index $M_P$ represents the number of transmission antennas included in the transmitter of the $P^{th}$ transmission antenna group.

The first to $M_P^{th}$ modulators 571-1 to 571-$M_P$ each modulate signals received from the first to $L_P^{th}$ encoders 561-1 to 561-$L_P$ in a predetermined modulation scheme. The first to $M_P^{th}$ modulators 571-1 to 571-$M_P$ provide modulation symbols $S_1$ to $S_{MP}$ to (M–$M_P$+1)$^{th}$ to $M^{th}$ transmission antennas ANT#(M–$M_P$+1) to ANT#M, respectively. The (M–$M_P$+1)$^{th}$ to $M^{th}$ transmission antennas ANT#(M–$M_P$+1) to ANT#M transmit to the air the modulation symbols $S_1$ to $S_{MP}$ output from the first to $M_P^{th}$ modulators 571-1 to 571-$M_P$.

As described in conjunction with FIG. 5, the combined array processing and diversity classifies M transmission antennas into P transmission antenna groups, and then modulates input information data according to the groups before transmission, thereby increasing diversity gain efficiency. In addition, the combined array processing and diversity technique transmits a non-overlapping signal through transmission antennas.

FIG. 6 is a block diagram schematically illustrating a receiver structure based on the combined array processing and diversity technique, and corresponding to the transmitter structure of FIG. 5. Referring to FIG. 6, a signal transmitted to the air by a transmitter is received through reception antennas of the receiver. It is assumed in FIG. 6 that there are provided N reception antennas. The N reception antennas each process signals received from the air. Specifically, signals received through first to $N^{th}$ reception antennas ANT#1 to ANT#N are provided to a channel estimator 611 and an interference suppressor 613. The channel estimator 611 performs channel estimation on signals output from the first to $N^{th}$ reception antennas ANT#1 to ANT#N, and then provides the channel estimation result to the interference suppressor 613. The interference suppressor 613 removes an interference component from each of the signals output from the first to $N^{th}$ reception antennas ANT#1 to ANT#N based on the channel estimation result output from the channel estimator 611, and then provides its outputs to first to $P^{th}$ decoders 615-1 to 615-P. Considering signals output from the first to $N^{th}$ reception antennas ANT#1 to ANT#N, of the N reception antennas, $\Sigma M_p p = \{2 \sim p\}$ reception antennas are used to remove the interference component and the other reception antennas are used to increase diversity gain. A process of removing by the interference suppressor 613 an interference component from the signals received from the first to $N^{th}$ reception antennas ANT#1 to ANT#N is also disclosed in Vahid Tarokh, A. Naguib, N. Seshadri, and A. Calderbank, "Combined Array Processing And Space Time Coding." IEEE Trans. Inform. Theory, Vol. 45, pp. 1121-1128, May 1999, so a detailed description thereof will be omitted for simplicity. The interference component-removed signals output from the interference compressor 613 are provided to the first to $P^{th}$ decoders 615-1 to 615-P. The first to $P^{th}$ decoders 615-1 to 615-P each perform STTC decoding on signals output from the interference compressor 613, and output $\hat{d}_{11}\hat{d}_{21}\hat{d}_{31} \ldots \hat{d}_{L1}$ to $\hat{d}_{1P}\hat{d}_{2P}\hat{d}_{3P} \ldots \hat{d}_{LP}$.

The combined array processing and diversity technique can simply trade off a diversity gain, i.e., a diversity order, with a data rate. In order to increase the diversity order, the number of transmission antenna groups of a transmitter must be increased. In addition, a receiver can relatively simply remove an interference component through the operation of removing the interference component. However, the combined array processing and diversity brings about a great loss in diversity gain in the process of trading off the diversity gain with the data rate. For example, it will be assumed that a transmitter has 3 transmission antennas and a receiver also has 3 reception antennas. The transmitter forms two transmission antennas into a first transmission antenna group, and forms the remaining one transmission antenna into a second transmission antenna group. Thus, it will be assumed that the transmitter transmits a first stream through the first transmission antenna group and a second stream through the second transmission antenna group. In this case, the receiver removes the second stream that acts as an interference component when decoding the first stream, thereby obtaining a diversity gain of a level 4. However, the receiver removes the first stream that acts as an interference component when decoding the second stream, so it has a diversity gain of a level 1, and this operates as if there is no diversity gain. Therefore, the combined array processing and diversity technique has a great loss of diversity gain when the number of transmission antennas of the transmitter is small.

In order to eliminate the diversity gain loss of the combined array processing and diversity technique, there has been proposed a technique for transmitting a signal by overlapping a plurality of transmission antennas, and the technique for transmitting a signal by overlapping the transmission antennas is called "overlapped combined array processing and diversity." The overlapped combined array processing and diversity technique is disclosed in Korean patent application No. 2002-59621, filed on Sep. 30, 2002, and commonly assigned to the assignee of this application, the contents of which are incorporated herein by reference. This reference discloses a technique for transmitting/receiving a signal by grouping transmission antennas so that some transmission antennas among the transmission antennas overlap one another.

FIG. 7 is a block diagram schematically illustrating a general structure of an STTC transmitter based on the overlapped combined array processing and diversity technique. Referring to FIG. 7, the transmitter includes M transmission antennas, and classifies the M transmission antennas into P groups. That is, $M_P$ transmission antennas constitute one group, and each group performs the transmission operation, i.e., encoding and modulation operations, described in conjunction with FIG. 1. Here, the sum of $M_1$ to $M_P$ exceeds M. The reason that the sum of $M_1$ to $M_P$ exceeds M is because the overlapped combined array processing and diversity technique fundamentally overlaps transmission antennas. The overlapped combined array processing and diversity technique will now be described with reference to a first transmission antenna group and a $P^{th}$ transmission antenna group among the P transmission antenna groups.

First, the first transmission antenna group will be described. If L information data bits $d_{11}, d_{21}, d_{31}, \ldots, d_{L1}$ are input to a transmitter of the first transmission antenna group, the input information data bits $d_{11}, d_{21}, d_{31}, \ldots, d_{L1}$ are provided to an S/P converter 711. Here, the index L represents the number of information data bits to be transmitted by the transmitter of the first transmission antenna group for a unit transmission time, and the unit transmission time can become a symbol unit. In addition, the index "1" succeeding the index L represents the first transmission antenna group. The S/P converter 711 parallel-converts the information data bits $d_{11}$, $d_{21}, d_{31}, \ldots, d_{L1}$ and provides its outputs to first to $L_1^{th}$ encoders 721-1 to 721-$L_1$. That is, the S/P converter 711 provides a parallel-converted information data bit $d_{11}$, to the first encoder 721-1, and in this manner, provides a parallel-converted information data bit $d_{L1}$ to the $L_1^{th}$ encoder 721-$L_1$. The first to $L_1^{th}$ encoders 721-1 to 721-$L_1$ each encode signals output from the S/P converter 711 in a predetermined encoding scheme, and then provide their outputs to first to $M_1^{th}$ modulators 731-1 to 731-$M_1$. Here, the index $M_1$ represents the number of transmission antennas included in the transmitter of the first transmission antenna group, and the predetermined encoding scheme is an STTC encoding scheme.

The first to $M_1^{th}$ modulators 731-1 to 731-$M_1$ each modulate signals received from the first to $L_1^{th}$ encoders 721-1 to 721-$L_1$ in a predetermined modulation scheme. The first to $M_1^{th}$ modulators 731-1 to 731-$M_1$ provide modulation symbols $S_1$ to $S_{M1-1}$ to a first summer 741-1. Here, the summers are matched to the transmission antennas on a one-to-one basis, and the first summer 741-1 is connected to a first transmission antenna ANT#1. Of the modulation symbols $S_1$ to $S_{M1}$, the modulation symbol $S_{M1}$ is provided even to the second summer 741-2, and the reason is because a signal output from the $M_1^{th}$ modulator 731-$M_1$ among output signals of the first transmission antenna group overlaps with output signals of a second transmission antenna group. The summer 741-1 sums up the modulation symbols $S_1$ to $S_{M1}$ and transmits the summation result to the air through the first transmission antenna ANT#1.

Second, the $P^{th}$ transmission antenna group will be described. If L information data bits $d_{1P}, d_{2P}, d_{3P}, \ldots, d_{LP}$ are input to a transmitter of the $P^{th}$ transmission antenna group, the input information data bits $d_{1P}, d_{2P}, d_{3P}, \ldots, d_{LP}$ are provided to an S/P converter 751. Here, the index "P" succeeding the index L represents the $P^{th}$ transmission antenna group. The S/P converter 751 parallel-converts the information data bits $d_{1P}, d_{2P}, d_{3P}, \ldots, d_{LP}$ and provides its outputs to first to $L_P^{th}$ encoders 761-1 to 761-$L_P$. That is, the S/P converter 751 provides a parallel-converted information data bit dip to the first encoder 761-1, and in this manner, provides a parallel-converted information data bit $d_{LP}$ to the $L_P^{th}$ encoder 761-$L_P$. The first to $L_P^{th}$ encoders 761-1 to 761-$L_P$ each encode signals output from the S/P converter 751 in an STTC encoding scheme, and then provide their outputs to first to $M_P^{th}$ modulators 771-1 to 771-$M_P$. Here, the index $M_P$ represents the number of transmission antennas included in the transmitter of the $P^{th}$ transmission antenna group.

The first to $M_P^{th}$ modulators 771-1 to 771-$M_P$ each modulate signals received from the first to $L_P^{th}$ encoders 761-1 to 761-$L_p$ in a predetermined modulation scheme. The first to $M^{pth}$ modulators 771-1 to 771-$M_P$ provide modulation symbols $S_1$ to $S_{MP}$ to an $M^{th}$ summer 741-M. Of the modulation symbols $S_1$ to $S_{MP}$, the modulation symbol $S_1$ is provided even to the second summer 741-2, and the reason is because a signal output from the first modulator 771-1 among output signals of the $P^{th}$ transmission antenna group overlaps with output signals of the second transmission antenna group. The summer 741-M sums up the modulation symbols $S_1$ to $S_{M1}$ and transmits the summation result to the air through the $M_{th}$ transmission antenna ANT#M.

FIG. 8 is a block diagram schematically illustrating a receiver structure based on the overlapped combined array processing and diversity technique, and corresponding to the transmitter structure of FIG. 7. Referring to FIG. 8, a signal transmitted to the air by a transmitter is received through reception antennas of the receiver. It is assumed in FIG. 8 that there are provided N reception antennas. The N reception antennas each of which process signals received from the air. Specifically, signals received through first to $N^{th}$ reception antennas ANT#1 to ANT#N are provided to a channel estimator 811 and an interference suppressor 813. The channel estimator 811 performs channel estimation on signals output from the first to $N^{th}$ reception antennas ANT#1 to ANT#N, and then provides the channel estimation result to the interference suppressor 813. The interference suppressor 813 removes an interference component from each of the signals output from the first to $N^{th}$ reception antennas ANT#1 to ANT#N based on the channel estimation result output from the channel estimator 811, and then provides its outputs to first to $P^{th}$ decoders 815-1 to 815-P. Considering signals output from the first to $N^{th}$ reception antennas ANT#1 to ANT#N, of the N reception antennas, $(M-M_P)$ reception antennas are used to remove the interference component and the other reception antennas are used to increase diversity gain. A process of removing by the interference suppressor 813 an interference component from the signals received from the first to $N^{th}$ reception antennas ANT#1 to ANT#N is disclosed in Korean patent application No. 2002-59621, filed on Sep. 30, 2002, and commonly assigned to the assignee of this application, and is hereby incorporated by reference. A detailed description thereof will be omitted for simplicity. The interference component-removed signals output from the interference compressor 813 are provided to the first to $P^{th}$ decoders 815-1 to 815-P. The first to $P^{th}$ decoders 815-1 to 815-P each perform STTC decoding on signals output from the interference compressor 813, and output $\hat{d}_{11}\hat{d}_{21}\hat{d}_{31} \ldots \hat{d}_{L1}$ to $\hat{d}_{1P}\hat{d}_{2P}\hat{d}_{3P} \ldots \hat{d}_{LP}$. In the receiver based on the overlapped combined array processing and diversity technique illustrated in FIG. 8, a diversity gain becomes $N-M+M_P$.

The overlapped combined array processing and diversity technique, as mentioned above, uses an overlapping method when grouping transmission antennas, so it can have a higher diversity gain as compared with the combined array processing and diversity technique. However, due to the overlapping method, even though the receiver eliminates an interference component, the interference component may exist, so that parallel transition is permitted in a trellis diagram. For example, when a transmitter has 3 transmission antennas and a receiver also has 3 reception antennas, a first stream is transmitted through a first transmission antenna and a second stream is transmitted through a second transmission antenna. In this case, information on the first transmission stream is added to information on the second transmission stream, and transmitted through the second transmission antenna. The receiver then performs interference suppression on a signal transmitted through a third transmission antenna only for a signal of the second stream when decoding the first stream, so the receiver has a diversity gain of a level 4 by achieving diversity gain for the 2 reception antennas. Likewise, the receiver is permitted to perform interference suppression on a signal transmitted from the first transmission antenna corresponding to only a signal of the first stream when decoding the second stream, so the receiver has a diversity gain of a level 4 by achieving diversity gain for the 2 reception antennas. However, as to a signal transmitted from the second transmission antenna according to the overlapping method, its modulation order is increased undesirably, since the first stream and the second stream overlap each other during transmission. For example, if modulation symbols of a transmission stream are 16QAM symbols, a signal transmitted from the second transmission antenna becomes a 256QAM signal obtained by overlapping 16QAM symbols. The 256QAM symbol and the 16QAM symbol are different from each other in their peak-to-average power ratio (hereinafter referred to as "PAPR"), and disadvantageously require design modification for a radio frequency (RF) processor. Finally, the overlapped combined array processing and diversity technique is disadvantageous in that it must consider parallel transition as mentioned above. A trellis structure that considers the parallel transition will be described with reference to FIG. 13.

FIG. 13 illustrates a trellis structure based on the overlapped combined array processing and diversity technique. Since the overlapped combined array processing and diversity technique has the trellis structure that considers the parallel transition as illustrated in FIG. 13, an error rate may be increased undesirably due to the parallel transition, and in addition, an amount of trellis calculation is doubled undesirably due to the parallel transition.

SUMMARY OF THE INVENTION

It is, therefore, an object of the present invention to provide a data transmission/reception apparatus and method for achieving both diversity gain and multiplexing gain in a mobile communication system using STTC.

It is another object of the present invention to provide a data transmission/reception apparatus and method for minimizing an error rate in an STTC mobile communication system using an overlapped combined array processing and diversity technique.

It is further another object of the present invention to provide a data transmission/reception apparatus and method having the same wireless standard in an STTC mobile communication system using an overlapped combined array processing and diversity technique.

To achieve the above and other objects, the invention provides an apparatus for transmitting data in a mobile communication system including at least three transmission antennas of first to third transmission antennas, and using an overlapped antenna scheme for grouping the first and second transmission antennas into a first transmission antenna group and grouping the second and third transmission antennas into a second transmission antenna group. The apparatus comprises first and second modulators for receiving L information bit streams to be transmitted through the first transmission antenna group, modulating each of the L information bit streams in a predetermined modulation scheme, and outputting first and second modulation symbol streams; third and fourth modulators for receiving L other information bit streams to be transmitted through the second transmission antenna group, modulating each of the L information bit streams in the modulation scheme, and outputting third and fourth modulation symbol streams; first to fourth puncturers for receiving the first to fourth modulation symbol streams, respectively, and puncturing at least one modulation symbol in a predetermined position among the received first to fourth modulation symbol streams; and a multiplexer for transmitting a modulation symbol stream output from the first puncturer through the first transmission antenna, transmitting a modulation symbol stream output from the second puncturer and a modulation symbol stream output from the third puncturer through the second transmission antenna after summing up the modulation symbol streams, and transmitting a modulation symbol stream output from the third puncturer through the third transmission antenna.

To achieve the above and other objects, the invention further provides an apparatus for receiving data in a mobile communication system which receives through N reception antennas modulation symbol streams transmitted through M transmission antennas from a transmitter. The apparatus comprises a channel estimator connected to each of the N reception antennas, for channel-estimating reception symbol streams output from the N reception antennas; an interference suppressor connected to each of the N reception antennas, for eliminating a reception symbol in at least one predetermined position as an interference component from each of reception symbol streams output from the N reception antennas; M modulators for modulating each of all information bit streams that can be possibly transmitted from the transmitter, in a predetermined modulation scheme, and outputting modulation symbol streams; M puncturers for puncturing at least one modulation symbol in a predetermined position from each of modulation symbol streams output from the M modulators; and a transmission symbol stream detector for detecting transmission symbol streams transmitted from the transmitter by considering parallel transition based on the reception symbol streams and a hypothetic channel output in a case where modulation symbol streams output from the M puncturers were transmitted through the same channel as a channel estimated by the channel estimator.

To achieve the above and other objects, the invention also provides a method for transmitting data in a mobile communication system including at least three transmission antennas of first to third transmission antennas, and using an overlapped antenna scheme for grouping the first and second transmission antennas into a first transmission antenna group and grouping the second and third transmission antennas into a second transmission antenna group. The method comprises the steps of receiving L information bit streams to be transmitted through the first transmission antenna group, modulating each of the L information bit streams in a predetermined modulation scheme, and outputting first and second modulation symbol streams; receiving L other information bit streams to be transmitted through the second transmission antenna group, modulating each of the L information bit streams in the modulation scheme, and outputting third and fourth modulation symbol streams; receiving the first to fourth modulation symbol streams, and puncturing at least one modulation symbol in a predetermined position among the received first to fourth modulation symbol streams, and outputting first to fourth punctured modulation symbol streams; and transmitting the first punctured modulation symbol stream through the first transmission antenna, transmitting the second and third punctured modulation symbol streams through the second transmission antenna after summing up the second and third punctured modulation symbol streams, and transmitting the fourth punctured modulation symbol stream through the third transmission antenna.

To achieve the above and other objects, the invention additionally provides a method for receiving data in a mobile communication system which receives through N reception antennas modulation symbol streams transmitted through M transmission antennas from a transmitter. The method comprises the steps of channel-estimating reception symbol streams output from the N reception antennas; eliminating a reception symbol in at least one predetermined position as an interference component from each of reception symbol streams output from the N reception antennas; modulating each of all information bit streams that can be possibly transmitted from the transmitter, in a predetermined modulation scheme, and outputting M modulation symbol streams; puncturing at least one modulation symbol in a predetermined position from each of the M modulation symbol streams; and detecting transmission symbol streams transmitted from the transmitter by considering parallel transition based on the reception symbol streams and a hypothetic channel output in a case where modulation symbol streams from which at least one modulation symbol was punctured were transmitted through the same channel as the channel-estimated channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
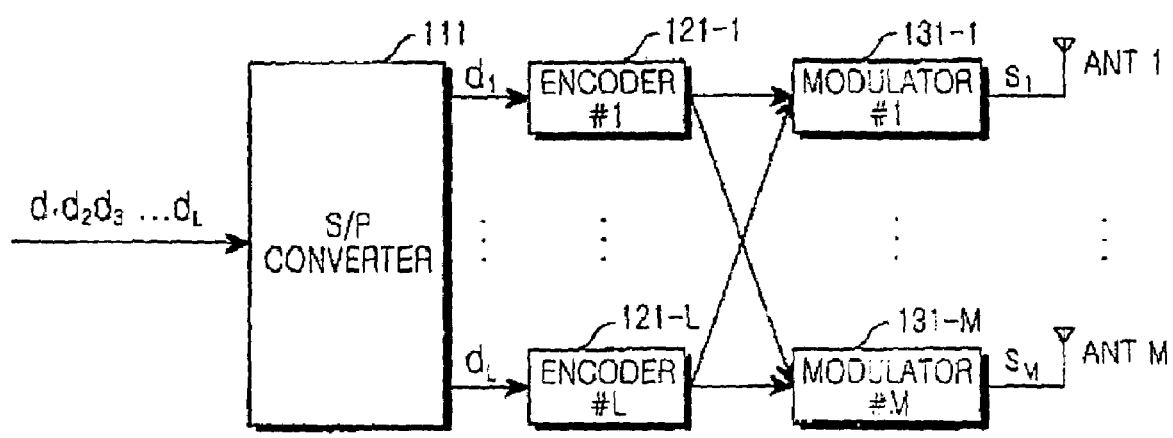
FIG. 1 is a block diagram schematically illustrating a general structure of a transmitter using STTC.
Figure 2:
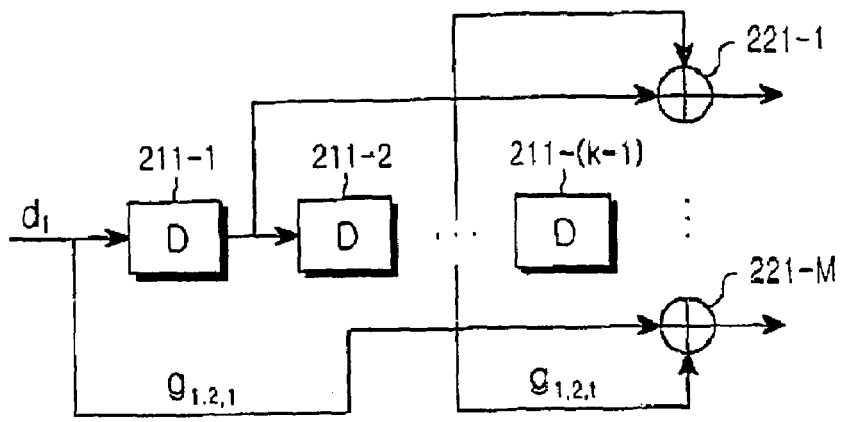
FIG. 2 is a block diagram illustrating a detailed structure of the first to $L^{th}$ encoders of FIG. 1.
Figure 3:
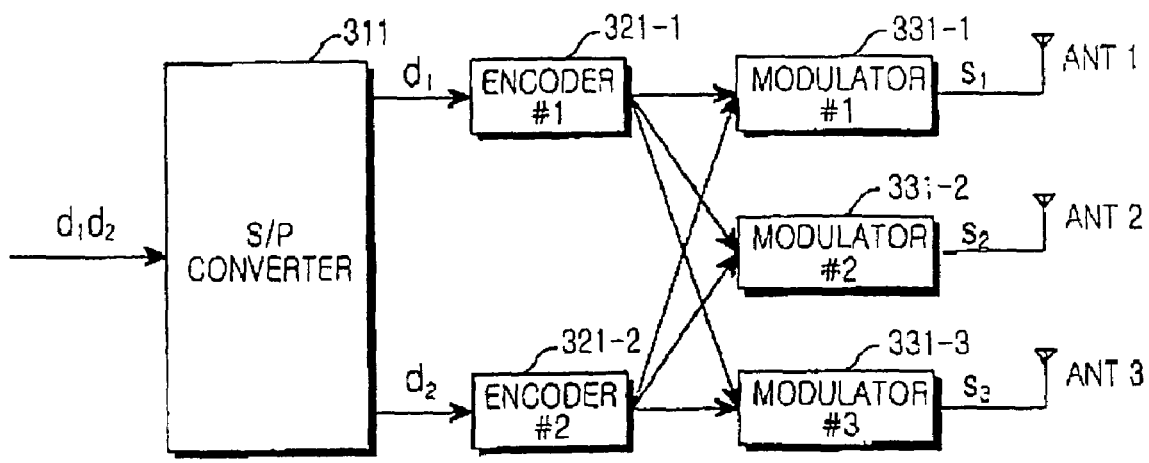
FIG. 3 is a block diagram schematically illustrating a structure of an STTC transmitter having two encoders and three transmission antennas.
Figure 4:
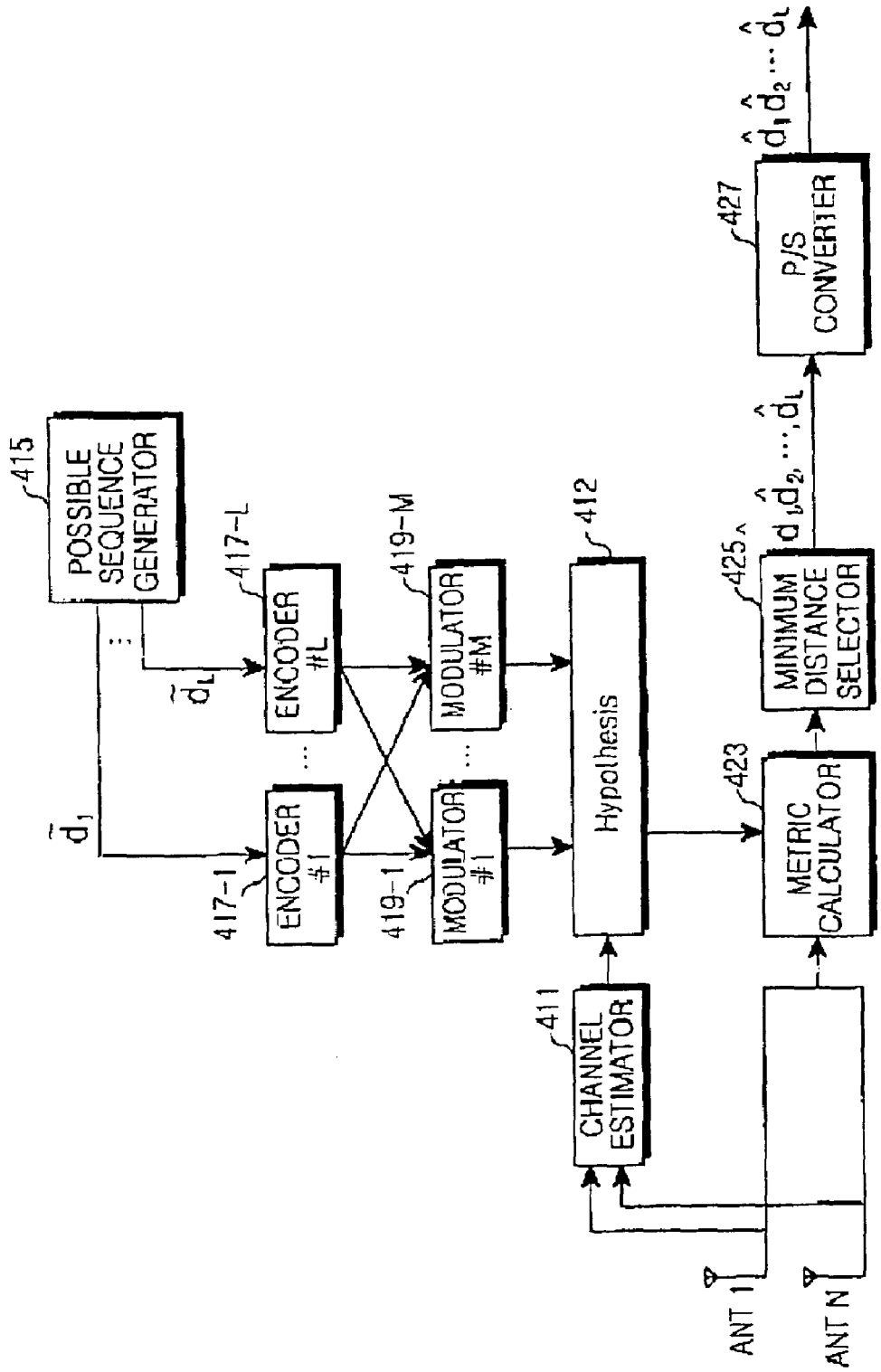
FIG. 4 is a block diagram schematically illustrating a receiver structure corresponding to the transmitter structure of FIG. 1.
Figure 5:
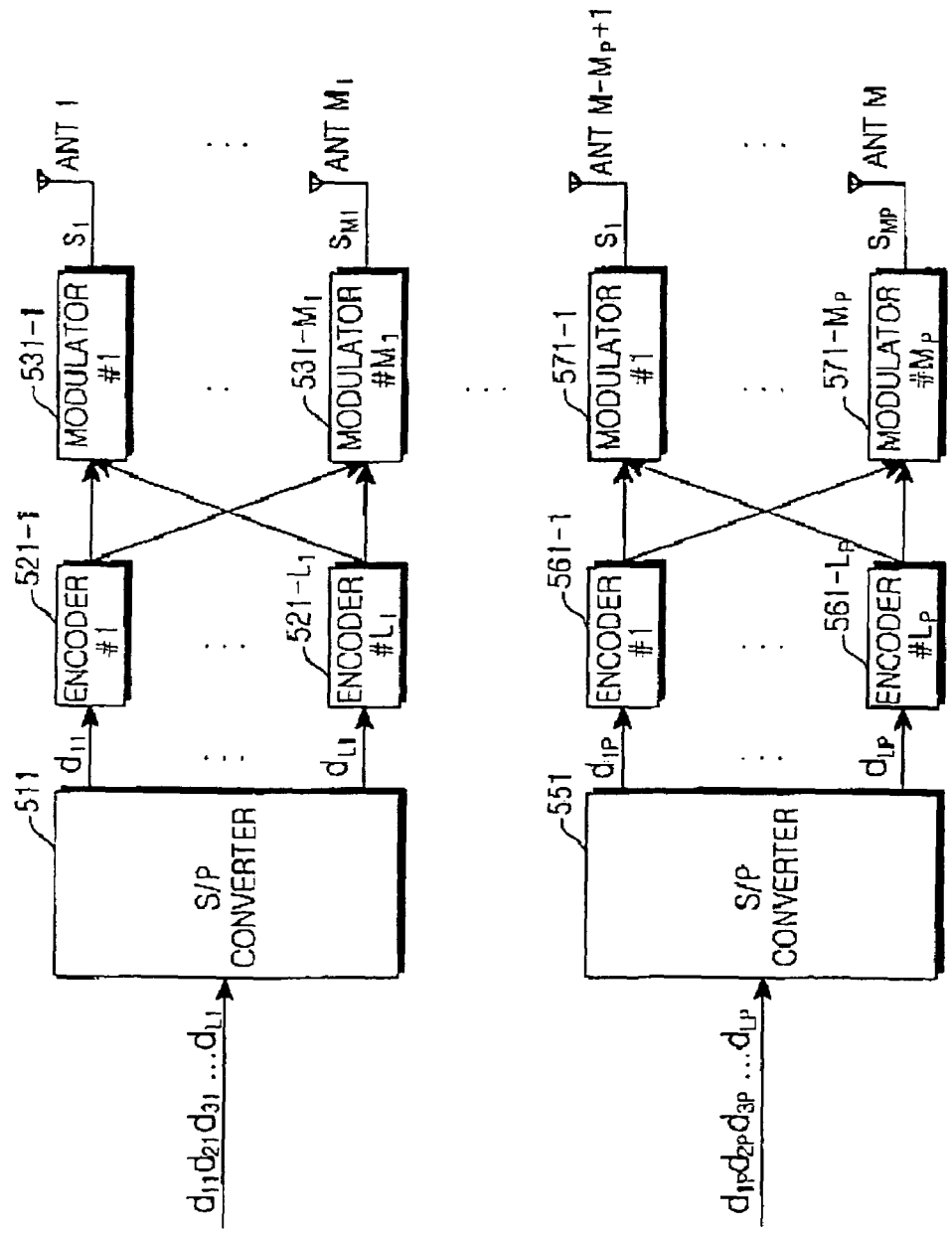
FIG. 5 is a block diagram schematically illustrating a general structure of an STTC transmitter using a combined array processing and diversity technique.
Figure 6:
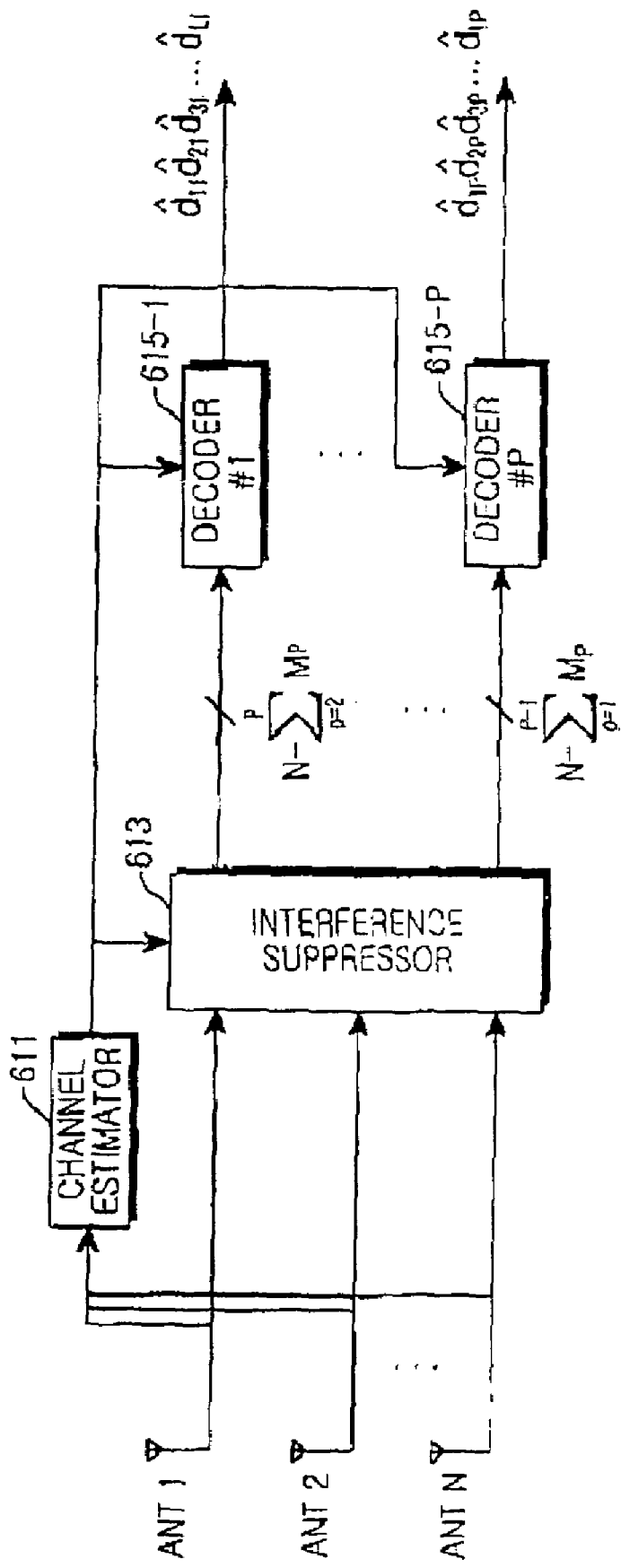
FIG. 6 is a block diagram schematically illustrating a receiver structure corresponding to the transmitter structure of FIG. 5.
Figure 7:
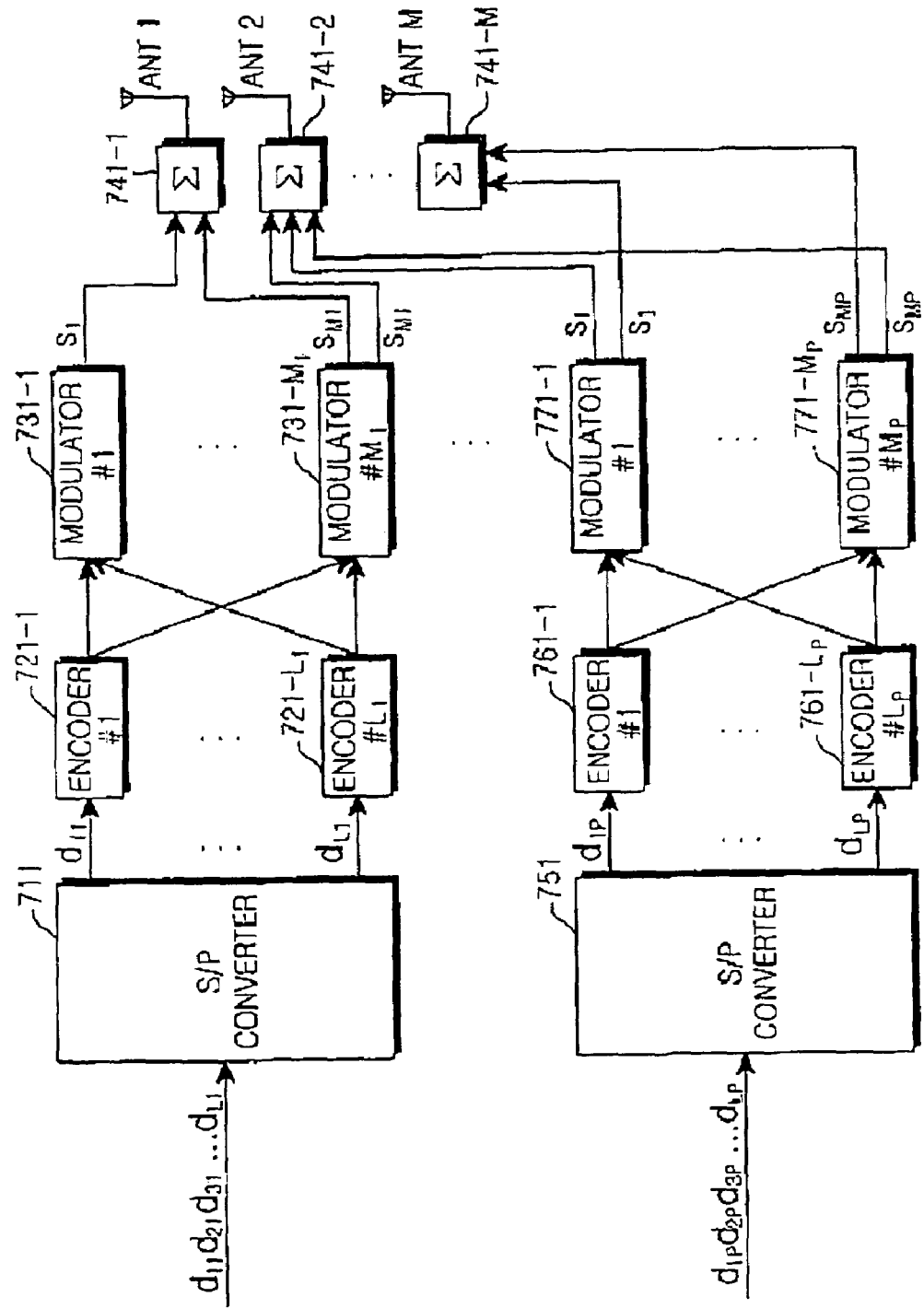
FIG. 7 is a block diagram schematically illustrating a general structure of an STTC transmitter based on the overlapped combined array processing and diversity technique.
Figure 8:
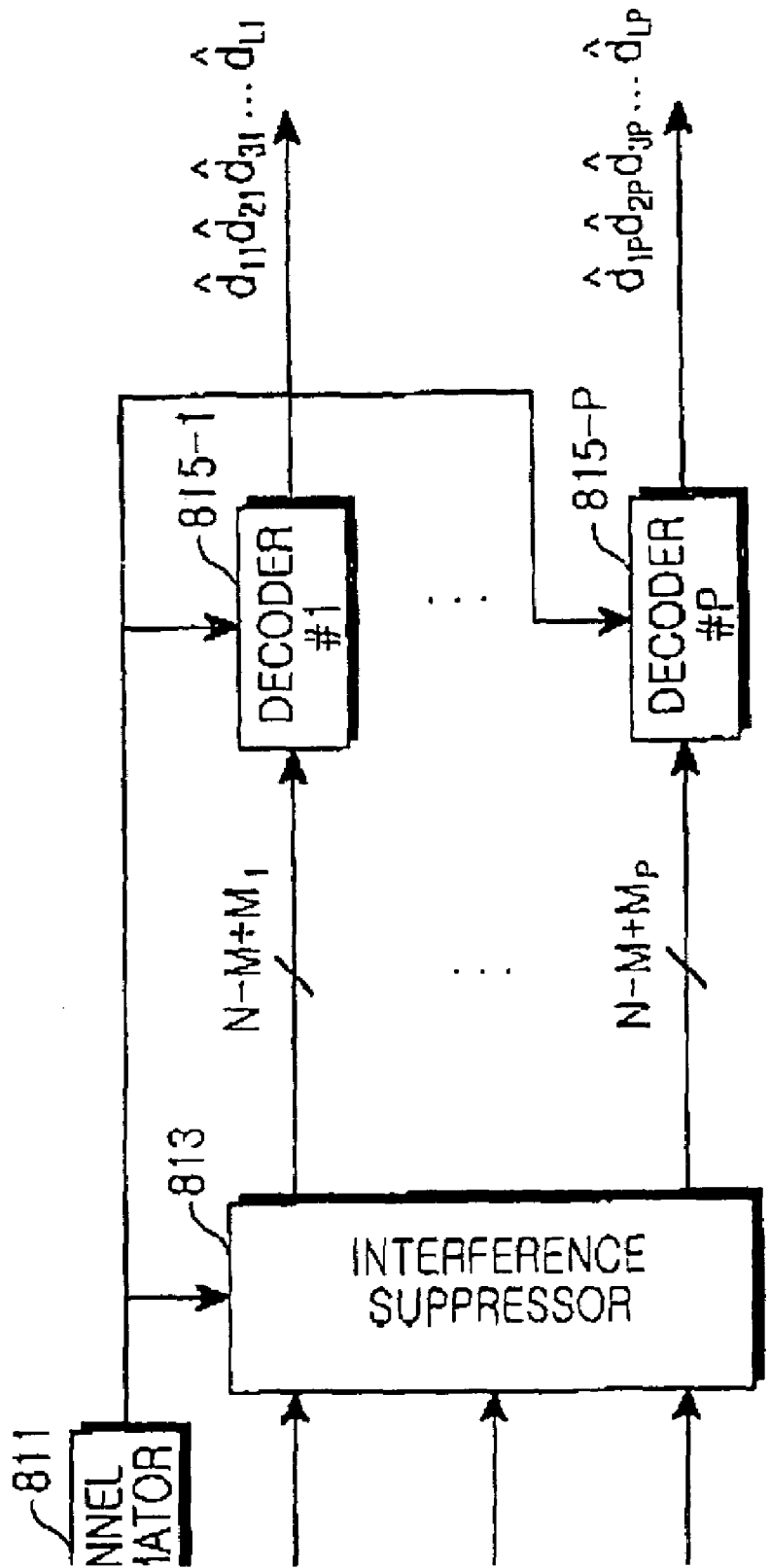
FIG. 8 is a block diagram schematically illustrating a receiver structure corresponding to the transmitter structure of FIG. 7.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 9:
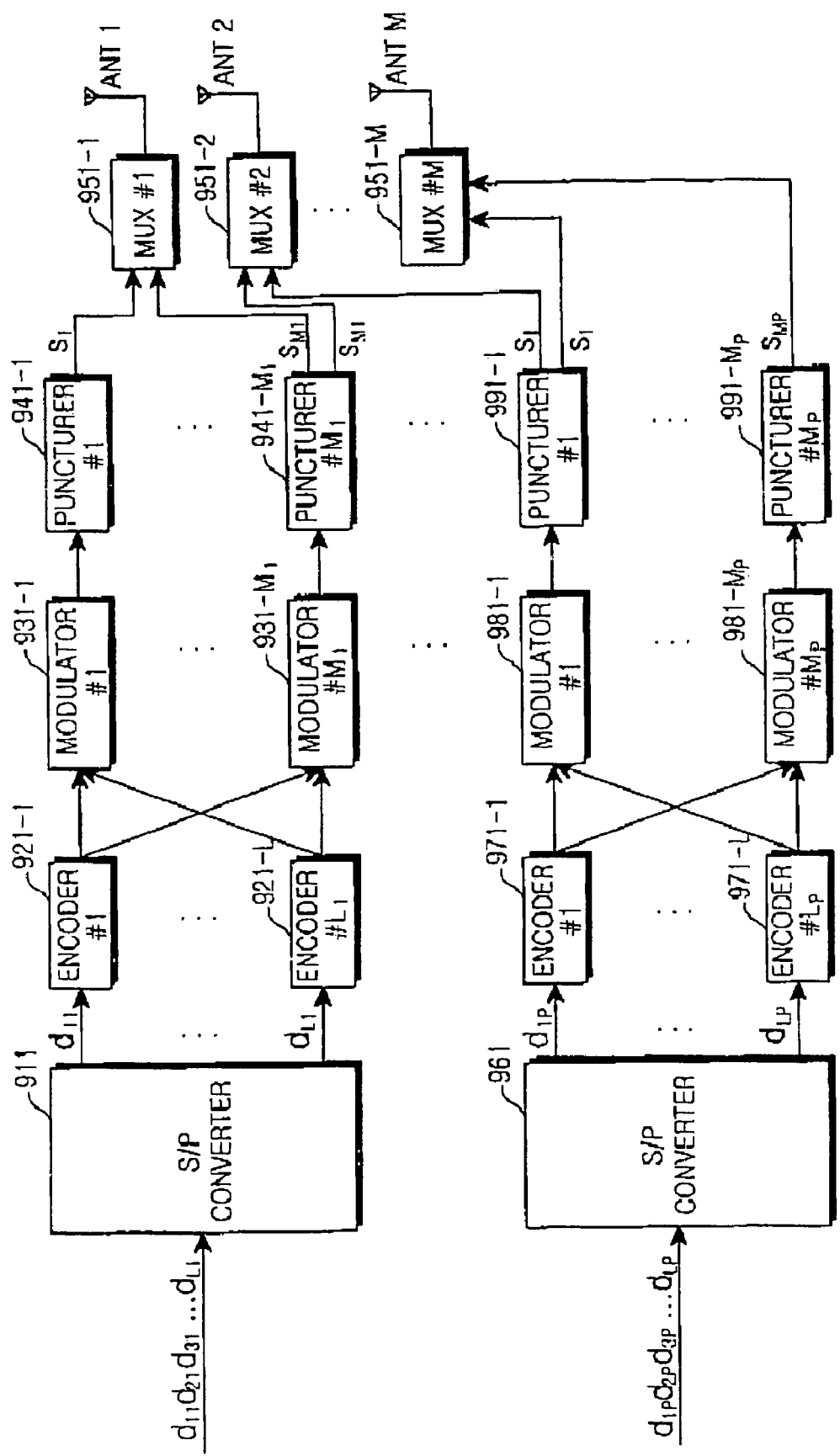
FIG. 9 is a block diagram schematically illustrating a structure of a transmitter using a space-time trellis code (STTC) according to an embodiment of the present invention.

FIG. 9 is a block diagram schematically illustrating a structure of a transmitter using a space-time trellis code (hereinafter referred to as "STTC") according to an embodiment of the present invention. Referring to FIG. 9, the transmitter includes M transmission antennas, and classifies the M transmission antennas into P groups. That is, $M_P$ transmission antennas constitute one group, and each group performs the transmission operation, i.e., encoding and modulation operations, described in conjunction with FIG. 1. Here, the sum of $M_1$ to $M_P$ exceeds M. The reason that the sum $$\sum_P M_P$$

of $M_1$ to $M_P$ exceeds M is because the overlapped combined array processing and diversity technique fundamentally overlaps transmission antennas. In the overlapped combined array processing and diversity technique, the $$\sum_P M_P$$

modulation symbols are overlapped and then transmitted to the air through the M transmission antennas. However, in the present invention, the $$\sum_P M_P$$

modulation symbols are so punctured as to generate M modulation symbols, and then transmitted to the air through the M transmission antennas without being overlapped.

In this way, the P transmission antenna groups each perform a transmission operation, i.e., encoding and modulation operations, according to transmission antenna groups. Herein, $1 \sim M_1$ represent transmission antennas of a first transmission antenna group, and $1 \sim M_P$ represent transmission antennas of a $P^{th}$ transmission antenna group. In addition, it should be noted that the number of the $1^{st}$ to $M_1^{th}$ transmission antennas can be different from the number of the $1^{st}$ to $M_P^{th}$ transmission antennas. Further, the first to $P^{th}$ transmission antenna groups are identical in their transmission operation except the data applied thereto, so the invention will be described with reference to the first transmission antenna group and the $P^{th}$ transmission antenna group, for simplicity.

First, the first transmission antenna group will be described. If L information data bits $d_{11}, d_{21}, d_{31}, \ldots, d_{L1}$ are input to a transmitter of the first transmission antenna group, the input information data bits $d_{11}, d_{21}, d_{31}, \ldots, d_{L1}$ are provided to an S/P converter 911. Here, the index L represents the number of information data bits to be transmitted by the transmitter of the first transmission antenna group for a unit transmission time, and the unit transmission time can become a symbol unit. In addition, the index "1" succeeding the index L represents the first transmission antenna group. The S/P converter 911 parallel-converts the information data bits $d_{11}$, $d_{21}, d_{31}, \ldots, d_{L1}$ and provides its outputs to first to $L_1^{th}$ encoders 921-1 to 921-$L_1$. That is, the S/P converter 911 provides a parallel-converted information data bit $d_{11}$ to the first encoder 921-1, and in this manner, provides a parallel-converted information data bit $d_{L1}$ to the $L_1^{th}$ encoder 921-$L_1$. The first to $L_1^{th}$ encoders 921-1 to 921-$L_1$ each encode signals output from the S/P converter 911 in a predetermined encoding scheme, and then each provide their outputs to first to $M_1^{th}$ modulators 931-1 to 931-$M_1$. Here, the index $M_1$ represents the number of transmission antennas included in the transmitter of the first transmission antenna group, and the predetermined encoding scheme is an STTC encoding scheme.

The first to $M_1^{th}$ modulators 931-1 to 931-$M_1$ each modulate signals received from the first to $L_1^{th}$ encoders 921-1 to 921-$L_1$ in a predetermined modulation scheme. The first to $M^{1th}$ modulators 931-1 to 931-$M_1$ provide modulation symbols $S_1$ to $S_{M1}$ to first to $M_1^{th}$ puncturers 941-1 to 941-$M_1$, respectively. The first to $M_1^{th}$ modulators 931-1 to 931-$M_1$ are identical in their operation, so only the first modulator 931-1 will be described for simplicity. The first modulator 931-1 adds up signals received from the first to $L^{th}$ encoders 921-1 to 921-$L$, multiplies the addition result by a gain applied to a transmission antenna to which the first modulator 931-1 is connected, modulates the multiplication result in a predetermined modulation scheme, and provides the modulation result to the first puncturer 941-1. Here, the modulation scheme includes BPSK (Binary Phase Shift Keying), QPSK (Quadrature Phase Shift Keying), QAM (Quadrature Amplitude Modulation), PAM (Pulse Amplitude Modulation), and PSK (Phase Shift Keying). The first to $M_1^{th}$ puncturers 941-1 to 941-$M_1$ each puncture the modulation symbols $S_1$ to $S_{M1}$ received from the first to $M_1^{th}$ modulators 931-1 to 931-$M_1$ according to a predetermined puncturing matrix. The reason for puncturing the modulation symbols $S_1$ to $S_{M1}$ received from the first to $M_1^{th}$ modulators 931-1 to 931-$M_1$ according to a predetermined puncturing matrix is to eliminate an interference component caused by overlapping of transmission signals onto particular transmission antennas in the overlapped combined array processing and diversity technique. That is, the modulation symbols $S_1$ to $S_{M1}$ of the first transmission antenna group are punctured according to the puncturing matrix, so that a transmission signal of the first transmission antenna group does not act as an interference component of another transmission antenna group.

A description will now be made of a procedure in which the first to $M_1^{th}$ puncturers 941-1 to 941-$M_1$ puncture the modulation symbols $S_1$ to $S_{M1}$ output from the first to $M_1^{th}$ modulators 931-1 to 931-$M_1$, respectively.

The first to $M_1^{th}$ puncturers 941-1 to 941-$M_1$ periodically puncture modulation symbols $S_1$ to $S_{M1}$ output from the first to $M_1^{th}$ modulators 931-1 to 931-$M_1$ according to a corresponding transmission antenna. For example, if it is assumed that the number of transmission antennas of the first transmission antenna group is 2 and 4 symbols are transmitted through the 2 transmission antennas for a unit transmission period, then a puncturing matrix given by Equation (1) below is applied.

$$P_1 = \begin{bmatrix} 1 & 1 & 1 & 1 \\ 1 & 0 & 1 & 0 \end{bmatrix} \qquad \text{Equation (1)}$$

In Equation (1), $P_1$ represents a puncturing matrix. In the puncturing matrix $P_1$, a column represents a transmission period, i.e., a symbol period, and a row represents a transmission antenna. In the puncturing matrix $P_1$, an element "1" means that an input symbol is passed without being punctured, while an element "0" means that an input symbol is punctured, so that no symbol is transmitted for a corresponding period. That is, in the puncturing matrix $P_1$, for a first column, or a first symbol period, a signal output from a first modulator connected to a first transmission antenna and a signal output from a second modulator connected to a second transmission antenna are passed without being punctured. Unlike this, in the puncturing matrix $P_1$, for a second column, or a second symbol period, a signal output from the first modulator connected to the first transmission antenna is passed without being punctured, while a signal output from the second modulator connected to the second transmission antenna is punctured. In addition, in the puncturing matrix $P_1$, for a third column, or a third symbol period, a signal output from the first modulator connected to the first transmission antenna and a signal output from the second modulator connected to the second transmission antenna are passed without being punctured. Unlike this, in the puncturing matrix $P_1$, for a fourth column, or a fourth symbol period, a signal output from the first modulator connected to the first transmission antenna is passed without being punctured, while a signal output from the second modulator connected to the second transmission antenna is punctured.

The first to $M_1^{th}$ puncturers 941-1 to 941-$M_1$ puncture the modulation symbols $S_1$ to $S_{M1}$ output from the first to $M_1^{th}$ modulators 931-1 to 931-$M_1$ according to a predetermined puncturing matrix, and then provide their outputs to a first multiplexer (MUX#1) 951-1 and a second multiplexer (MUX#2) 951-2, respectively. Here, the multiplexers are matched to the transmission antennas on a one-to-one basis, and the first multiplexer 951-1 is connected to a first transmission antenna ANT#1. Of the modulation symbols $S_1$ to $S_{M1}$, the modulation symbol $S_{M1}$ is provided even to the second multiplexer 951-2, and the reason is because a signal output from the $M_1^{th}$ modulator 931-$M_1$ among output signals of the first transmission antenna group overlaps with output signals of a second transmission antenna group. The first multiplexer 951-1 multiplexes the modulation symbols $S_1$ to $S_{M1}$ and transmits the multiplexing result to the air through the first transmission antenna ANT#1.

Second, the $P^{th}$ transmission antenna group will be described. If L information data bits $d_{1P}, d_{2P}, d_{3P}, \ldots, d_{LP}$ are input to a transmitter of the $P^{th}$ transmission antenna group, the input information data bits $d_{1P}, d_{2P}, d_{3P}, \ldots, d_{LP}$ are provided to an S/P converter 961. Here, the index "P" succeeding the index L represents the $P^{th}$ transmission antenna group. The S/P converter 961 parallel-converts the information data bits $d_{1P}, d_{2P}, d_{3P}, \ldots, d_{LP}$ and provides its outputs to first to $L_P{}^{th}$ encoders 971-1 to 971-$L_P$. That is, the S/P converter 961 provides a parallel-converted information data bit dip to the first encoder 971-1, and in this manner, provides a parallel-converted information data bit $d_{LP}$ to the $L_P{}^{th}$ encoder 971-$L_P$. The first to $L_P{}^{th}$ encoders 971-1 to 971-$L_P$ each encode signals output from the S/P converter 961 in an STTC encoding scheme, and then each provide their outputs to first to $M_P{}^{th}$ modulators 981-1 to 981-$M_P$. Here, the index $M_P$ represents the number of transmission antennas included in the transmitter of the $P^{th}$ transmission antenna group.

The first to $M_P{}^{th}$ modulators 981-1 to 981-$M_P$ each modulate signals received from the first to $L_P{}^{th}$ encoders 971-1 to 971-$L_P$ in a predetermined modulation scheme, and provide their outputs to first to $M_P{}^{th}$ puncturers 991-1 to 991-$M_P$, respectively. The first to $M_P{}^{th}$ modulators 981-1 to 981-$M_P$ are identical in their operation, so only the first modulator 981-1 will be described for simplicity. The first modulator 981-1 adds up signals received from the first to $L_P{}^{th}$ encoders 971-1 to 971-$L_P$, multiplies the addition result by a gain applied to a transmission antenna to which the first modulator 981-1 is connected, modulates the multiplication result in a predetermined modulation scheme, and provides the modulation result to the first puncturer 991-1. The predetermined modulation scheme is identical to the modulation scheme applied to the first transmission antenna group. The first to $M^{Pth}$ puncturers 991-1 to 991-$M_P$ each puncture the modulation symbols $S_1$ to $S_{MP}$ received from the first to $M_P{}^{th}$ modulators 981-1 to 981-$M_P$ according to a predetermined puncturing matrix, and then provide their outputs to a second multiplexer 951-2 and an $M^{th}$ multiplexer 951-M, respectively. Also, the reason for puncturing the modulation symbols $S_1$ to $S_{MP}$ received from the first to $M_P{}^{th}$ modulators 981-1 to 981-$M_P$ according to the puncturing matrix is to eliminate an interference component caused by overlapping of transmission signals onto particular transmission antennas in the overlapped combined array processing and diversity technique. That is, the modulation symbols $S_1$ to $S_{MP}$ of the $P^{th}$ transmission antenna group are punctured according to the puncturing matrix, so that a transmission signal of the $P^{th}$ transmission antenna group does not act as an interference component of another transmission antenna group.

A description will now be made of a procedure in which the first to $M_P{}^{th}$ puncturers 991-1 to 991-$M_P$ puncture the modulation symbols $S_1$ to $S_{MP}$ output from the first to $M_P{}^{th}$ modulators 981-1 to 981-$M_P$, respectively.

The first to $M_P{}^{th}$ puncturers 991-1 to 991-$M_P$ periodically puncture modulation symbols $S_1$ to $S_{MP}$ output from the first to $M_P{}^{th}$ modulators 981-1 to 981-$M_P$ according to a corresponding transmission antenna. For example, if it is assumed that the number of transmission antennas of the $P^{th}$ transmission antenna group is 2 and 4 symbols are transmitted through the 2 transmission antennas for a unit transmission period, then a puncturing matrix given by Equation (1) above is applied. The first to $M_P{}^{th}$ puncturers 991-1 to 991-$M_P$ puncture the modulation symbols $S_1$ to $S_{MP}$ output from the first to $M_P{}^{th}$ modulators 981-1 to 981-$M_P$ according to a predetermined puncturing matrix, and then provide their outputs to the second multiplexer (MUX#2) 951-2 and an $M^{th}$ multiplexer (MUX#M) 951-M, respectively. The second to $M^{th}$ multiplexers 951-2 to 951-M multiplex signals output from the first to $M_P{}^{th}$ puncturers 991-1 to 991-$M_P$, and transmit the multiplexing results to the air though the second to $M_{th}$ transmission antennas ANT#2 to ANT#M. When the puncturing matrix is applied to the modulation symbols $S_1$ to $S_{MP}$ in this way, modulation symbols transmitted through the second to $M^{th}$ transmission antennas ANT#2 to ANT#M do not act as an interference component for other transmission antennas.

Figure 10:
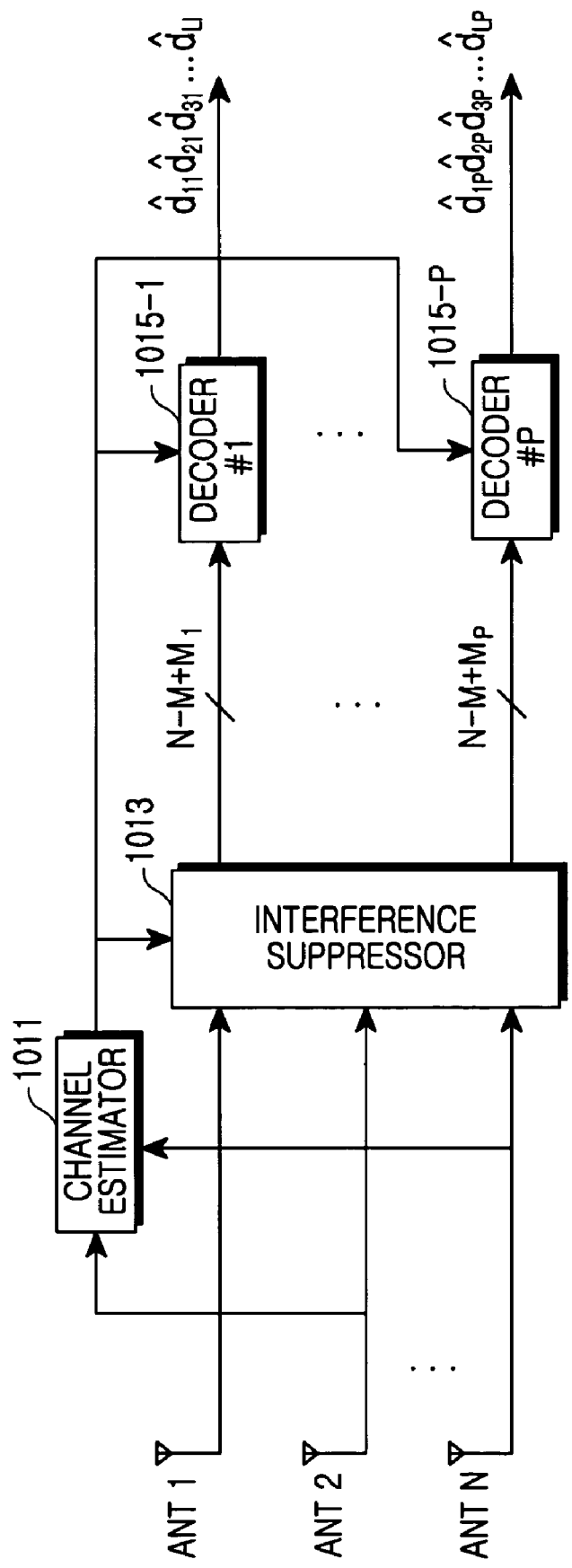
FIG. 10 is a block diagram schematically illustrating a receiver structure corresponding to the transmitter structure of FIG. 9.

FIG. 10 is a block diagram schematically illustrating a receiver structure corresponding to the transmitter structure of FIG. 9. Referring to FIG. 10, a signal transmitted to the air by a transmitter is received through reception antennas of the receiver. It is assumed in FIG. 10 that there are provided N reception antennas, each of which process signals received from the air. Specifically, signals received through first to $N^{th}$ reception antennas ANT#1 to ANT#N are provided to a channel estimator 1011 and an interference suppressor 1013. The channel estimator 1011 performs channel estimation on signals output from the first to $N^{th}$ reception antennas ANT#1 to ANT#N, and then provides the channel estimation result to the interference suppressor 1013 and first to $P^{th}$ decoders 1015-1 to 1015-P. The interference suppressor 1013 eliminates an interference component from each of the signals output from the first to $N^{th}$ reception antennas ANT#1 to ANT#N based on the channel estimation result output from the channel estimator 1011, and then provides its outputs to the first to $P^{th}$ decoders 1015-1 to 1015-P. A process of performing by the channel estimator 1011 channel estimation on the signals output from the first to $N^{th}$ reception antennas ANT#1 to ANT#N and a process of eliminating by the inference suppressor 1013 an interference component from the signals output from the first to $N^{th}$ reception antennas ANT#1 to ANT#N are disclosed in V. Tarokh, A. Naguib, N. Seshadri, and A. R. Calderbank, "Space-Time Codes For High Data Rate Wireless Communications: Performance Criterion And Code Construction." IEEE Trans. on Info. Theory, pp. 744-765, Vol. 44, No. 2, March 1998, and V. Tarokh, A. Naguib, N. Seshadri, and A. R. Calderbank, "Combined Array Processing And Space Time Coding" IEEE Trans. Inform. Theory, Vol. 45, pp. 1121-1128, May 1999, the contents of both of which are incorporated herein by reference. These references introduce a method for classifying N transmission antennas into non-overlapping small groups with a size $N_i$ and using space-time codes called component codes in order to transmit information from antennas of each group, thereby remarkably reducing complexity of coding and decoding. Then, the first to $P^{th}$ decoders 1015-1 to 1015-P each perform STTC decoding on signals output from the interference compressor 1013 based on the channel estimation result from the channel estimator 1011, and output the information data bits transmitted by the transmitter. Since the transmitter punctures modulation symbols before transmission, the first to $P^{th}$ decoders 1015-1 to 1015-P must consider this when decoding the modulation symbols, and an internal structure of the first to $P^{th}$ decoders 1015-1 to 1015-P will be described with reference to FIG. 11.

Figure 11:
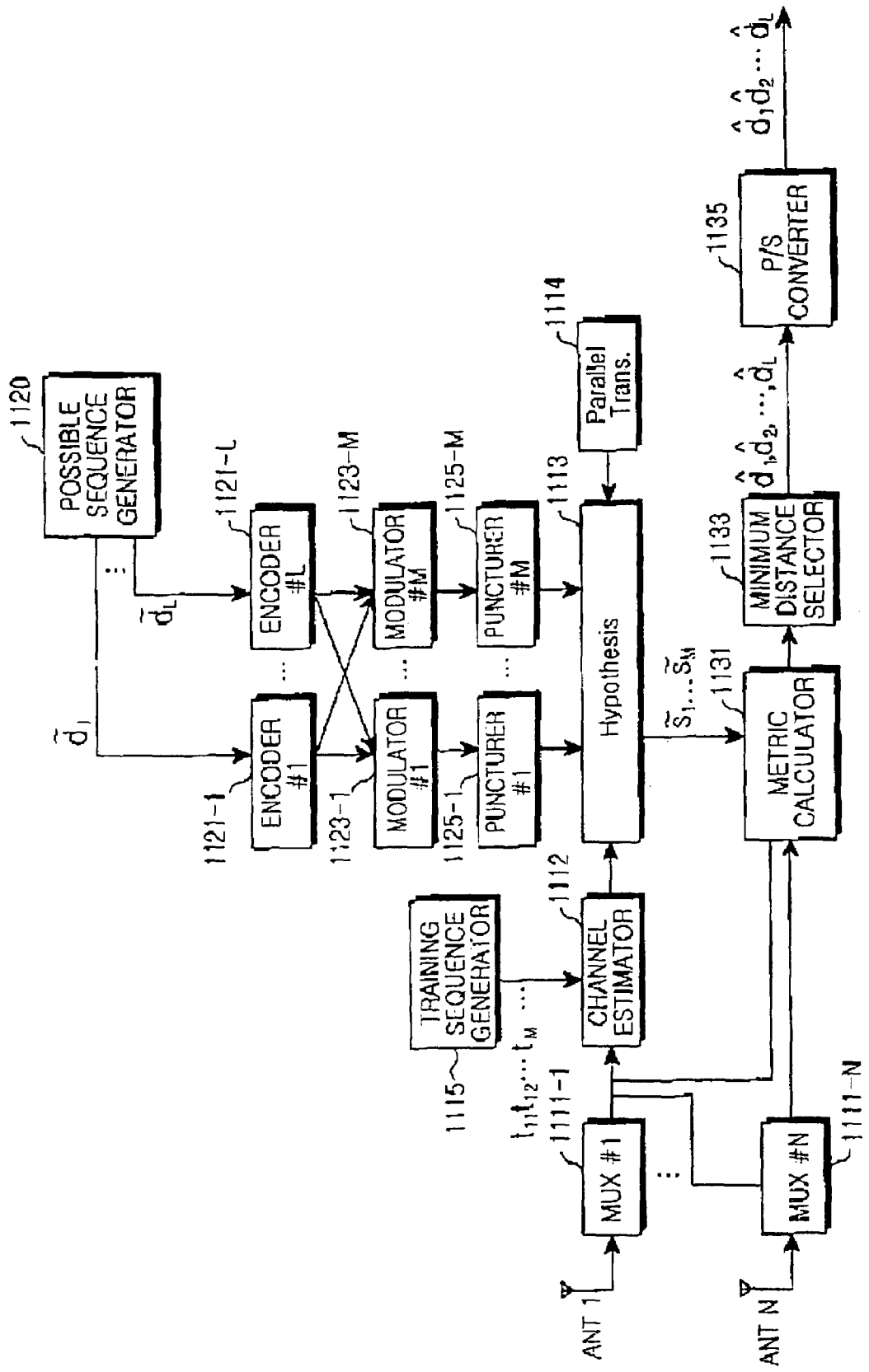
FIG. 11 is a block diagram illustrating an internal structure of the first to $P^{th}$ decoders of FIG. 10.

FIG. 11 is a block diagram illustrating an internal structure of the first to $P^{th}$ decoders 1015-1 to 1015-P of FIG. 10. The first to $P^{th}$ decoders 1015-1 to 1015-P described in conjunction with FIG. 10 all have the structure illustrated in FIG. 11, so only the first decoder 1015-1 will be described for simplicity. Referring to FIG. 11, a signal transmitted to the air by a transmitter is received through the reception antennas of the receiver. It is assumed in FIG. 11 that there are provided N reception antennas. The N reception antennas each process signals received from the air. Specifically, signals received through first to $N^{th}$ reception antennas ANT#1 to ANT#N are provided to first to $N^{th}$ demultiplexers 1111-1 to 1111-N, respectively. The first to $N^{th}$ demultiplexers 1111-1 to 1111-N demultiplex signals output from the first to $N^{th}$ reception antennas ANT#1 to ANT#N in a demultiplexing scheme corresponding to the multiplexing scheme applied in the STTC transmitter, and then provide their outputs to a channel estimator 1112 and a metric calculator 1131. The channel estimator 1112 channel-estimates signals output from the first to $N^{th}$ demultiplexers 1111-1 to 1111-N by using a training sequence generated from a training sequence generator 1115, and outputs the channel estimation result to a hypothesis part 1113.

A possible sequence generator 1120 generates all kinds of sequences which were possibly simultaneously encoded for information data bits in the transmitter, and provides the generated sequences to first to $L^{th}$ encoders 1121-1 to 1121-L. Since the transmitter transmits information data by the L information bits, the possible sequence generator 1120 generates possible sequences $ã_1 \ldots ã_L$ comprised of L bits. The L bits of the generated possible sequences are applied to the first to $L^{th}$ encoders 1121-1 to 1121-L, and the first to $L^{th}$ encoders 1121-1 to 1121-L encode the possible sequences $ã_1 \ldots ã_L$ output from the possible sequence generator 1120 in an STTC encoding scheme, and then provide the encoded bits to first to $M^{th}$ modulators 1123-1 to 1123-M. The first to $M^{th}$ modulators 1123-1 to 1123-M each modulate the encoded bits output from the first to $L^{th}$ encoders 1121-1 to 1121-L in a predetermined modulation scheme, and provide their outputs to first to $M^{th}$ puncturers 1125-1 to 1125-M. The modulation scheme applied in the first to $M^{th}$ modulators 1123-1 to 1123-M is determined as any one of the BPSK, QPSK, QAM, PAM and PSK modulation schemes, and the first to $M^{th}$ modulators 1123-1 to 1123-M apply a modulation scheme corresponding to the modulation scheme applied in the transmitter of FIG. 9.

The first to $M^{th}$ puncturers 1125-1 to 1125-M puncture signals output from the first to $M^{th}$ modulators 1123-1 to 1123-M in accordance with a puncturing matrix identical to the puncturing matrix applied in FIG. 9, and then provide their outputs to the hypothesis part 1113. The hypothesis part 1113 receives signals output from the first to $M^{th}$ puncturers 1125-1 to 1125-M and the channel estimation result output from the channel estimator 1112, generates a hypothetic channel output at a time when a sequence consisting of the signals output from the first to $M^{th}$ puncturers 1125-1 to 1125-M passed the same channel as the channel estimation result did, and provides the generated hypothetic channel output to the metric calculator 1131. However, in the present invention, when some of the modulation symbols to be transmitted through a particular transmission antenna are punctured in the transmitter, some of modulation symbols to be transmitted through another transmission antenna are multiplexed and inserted in the punctured symbol period. That is, in the present invention, a symbol stream transmitted from an overlapped antenna has a format formed such that not only its modulation symbols but also modulation symbols of another symbol stream are multiplexed and inserted in the transmission symbol stream. Therefore, a receiver must consider the modulation symbols of another symbol stream as parallel transition in a trellis during decoding, and in FIG. 11, a parallel transition part 1114 adds a value determined by multiplying a channel estimation result received at the receiver through a second transmission antenna ANT#2 by all kinds of constellations that can be transmitted through other symbol streams, to an originally calculated metric. That is, when two symbol streams are alternately transmitted, $2^{L \cdot 2}$ parallel transitions must be considered.

Meanwhile, the metric calculator 1131 receives the hypothetic channel output provided from the hypothesis part 1113 and the signals received through the first to $N^{th}$ reception antennas ANT#1 to ANT#N, and calculates a distance between the hypothetic channel output and the signals received through the first to $N^{th}$ reception antennas ANT#1 to ANT#N. The metric calculator 1131 uses Euclidean distance when calculating the distance. In this manner, the metric calculator 1131 calculates Euclidean distance for all possible sequences the transmitter can transmit, and then provides the calculated Euclidean distance to a minimum distance selector 1133. The minimum distance selector 1133 selects a Euclidean distance having the minimum distance from Euclidean distances output from the metric calculator 1131, determines information bits corresponding to the selected Euclidean distance as information bits transmitted by the transmitter, and provides the determined information bits to a parallel-to-serial (P/S) converter 1135. Although there are several possible algorithms used when the minimum distance selector 1133 determines information bits corresponding to the Euclidean distance having the minimum distance, it is assumed herein that a Viterbi algorithm is used. A process of extracting information bits having the minimum distance by using the Viterbi algorithm is disclosed in Vahid Tarokh, N. Seshadri, and A. Calderbank, "Space Time Codes For High Data Rate Wireless Communication: Performance Criterion And Code Construction," IEEE Trans. on Info. Theory, pp. 744-765, Vol. 44, No. 2, March 1998, so a detailed description thereof will not be provided for simplicity. The P/S converter 1135 then serial-converts the L information bits output from the minimum distance selector 1133, and outputs reception information data sequences $ã_1, ã_1, \ldots, ã_L$.

An operation of the present invention will now be described with reference to the transmitter structure and the receiver structure described above.

First, it will be assumed that the transmitter has M transmission antennas and the receiver has N reception antenna. A signal received at the receiver through the N reception antennas is represented by $$R = HS + N \qquad \text{Equation (2)}$$

In Equation (2), R denotes a signal received in an N×1 matrix, H denotes a channel characteristic, S denotes a transmission signal, and N denotes a noise component. The channel characteristic H is expressed in an N×M matrix, and each element of the N×M matrix is modeled with independent complex Gaussian. The noise component N is expressed in an N×1 vector, and represents a noise component received at the receiver. The transmission signal S is expressed in an M×1 vector, wherein an $m^{th}$ row represents a modulation symbol transmitted from an $m^{th}$ transmission antenna ANT#m. Here, the transmission signal S is comprised of P symbol streams, and each of the P streams is transmitted through $M_P$ transmission antennas. In addition, the P streams are streams which were independently punctured according to a puncturing matrix as described in conjunction with FIG. 10, and as a result, it can be considered that in the puncturing operation, each of the P streams uses as many transmission antennas as the number determined by excluding the $M_P$ punctured modulation symbols. Therefore, the present invention punctures $$\sum_P M_P$$

modulation symbols generated from $$\sum_P M_P$$

modulators according to a puncturing matrix so that the modulation symbols can be mapped to the M transmission antennas without being overlapped. Therefore, the transmission signal S is a signal which is mapped so that $$\sum_P M_P$$

modulation symbols are mapped to the M transmission antenna without being overlapped.

In order to decode a $P^{th}$ symbol stream, the receiver must eliminate other symbol streams except the $P^{th}$ symbol stream, considering them as an interference component. For that purpose, N rows representative of a channel characteristic from a transmission antenna, through which the $P^{th}$ symbol stream was transmitted to the receiver, must be eliminated from the channel characteristic H. An N×(M−$M_P$)-dimensional matrix determined by eliminating the N rows representing the channel characteristic from the transmission antenna to the receiver will be defined as an $H_P$ matrix. Assuming that a null space of the $H_P$ matrix is defined as $\Omega_P$, if the null space $\Omega_P$ of the $H_P$ matrix is multiplied by the reception signal R, a new reception signal R' from which other symbol streams acting as an interference component except the $P^{th}$ symbol stream were eliminated can be generated.

Meanwhile, it is assumed that the $P^{th}$ symbol stream is transmitted using $M_P$ transmission antennas and modulation symbols from q transmission antennas among the $M_P$ transmission antennas were punctured. Although the modulation symbols from the q transmission antennas were punctured, the q transmission antennas each multiplex modulation symbols of other symbol streams except the $P^{th}$ symbol stream before transmission. Therefore, it is necessary to prevent the multiplexed other symbol streams from acting as an interference component. For example, when modulation symbols modulated in an L-ary modulation scheme are transmitted from each of the q transmission antennas, a receiver must decode the modulation symbols by considering $q*2^L$ parallel transitions. That is, if it is assumed that one of symbol vectors corresponding to the $q*2^L$ parallel transitions is $S_c$ (c=1~$q*2^L$), the metric calculator 1131 of the receiver must subtract $\Omega_P H_P S_c$ from the calculated metric. C is a temporary variable whose range is 1~$q*2^L$.

A description will now be made of the reason why an interference component caused by actual overlapping of transmission antennas is eliminated using the puncturing pattern. Before the description is made, it should be noted that the parameters M, $M_1$ and $M_P$ generalized in the transmitter structure of FIG. 10 will be modified appropriately for the convenience of explanation. That is, in the transmitter structure of FIG. 9, it will be assumed that the M is 3, and $M_1$, $M_P$ and P are 2. In addition, it will be assumed herein that the transmitter applies BPSK as its modulation scheme, and transmits 4 symbols for a unit transmission time. Then, the first transmission antenna group consists of a first transmission antenna ANT#1 and a second transmission antenna ANT#2, and the $P^{th}$ transmission antenna group becomes a second transmission antenna group, which consists of the second transmission antenna ANT#2 and an $M^{th}$ transmission antenna ANT#M, i.e., a third transmission antenna ANT#3. Under the assumption stated above, the first and $M_1^{th}$ modulators 931-1 and 931-$M_1$ of the first transmission antenna group become first and second modulators 931-1 and 931-2, respectively, and the first and $M_1^{th}$ puncturers 941-1 and 941-$M_1$ of the first transmission antenna group become first and second puncturers 941-1 and 941-2, respectively. In addition, the first and $M_P^{th}$ modulators 981-1 and 981-$M_P$ of the $P^{th}$ transmission antenna group become first and second modulators 981-1 and 981-2, respectively, and the first and $M^{pth}$ puncturers 991-1 and 991-$M_P$ of the $P^{th}$ transmission antenna group become first and second puncturers 991-1 and 991-2, respectively. Further, the $M^{th}$ multiplexer 951-M becomes a third multiplexer 951-3.

Modulation symbols output from the first and second modulators 931-1 and 931-2 are input to the first and second puncturers 941-1 and 941-2, respectively, and the first and second puncturers 941-1 and 941-2 puncture the input modulation symbols by applying the puncturing matrix of Equation (1), and then provide the puncturing result to the first and second multiplexers 951-1 and 951-2. When the puncturing matrix $P_1$ of Equation (1) is applied, the first puncturer 941-1 provides 4 input modulation symbols to the first multiplexer 951-1 without puncturing any of them, and the second puncturer 941-2 provides 4 input modulation symbols to the second multiplexer 951-2 after puncturing a second modulation symbol and a fourth modulation symbol while not puncturing a first modulation symbol and a third modulation symbol.

Meanwhile, modulation symbols output from the first and second modulators 981-1 and 981-2 are input to the first and second puncturers 991-1 and 991-2, respectively, and the first and second puncturers 991-1 and 991-2 puncture the input modulation symbols by applying a puncturing matrix of Equation (3) below, and then provide the puncturing result to the second and third multiplexers 951-2 and 951-3.

$$P_2 = \begin{bmatrix} 0 & 1 & 0 & 1 \\ 1 & 1 & 1 & 1 \end{bmatrix} \qquad \text{Equation (3)}$$

When the puncturing matrix $P_2$ of Equation (3) is applied, the first puncturer 991-1 punctures a first modulation symbol and a third modulation symbol from 4 input modulation symbols, and provides a second modulation symbol and a fourth modulation symbol to the second multiplexer 951-2 without puncturing, and the second puncturer 991-2 provides 4 input modulation symbols to the third multiplexer 951-3 without puncturing any of them.

The first multiplexer 951-1 transmits an intact signal output from the first puncturer 941-1 through the first transmission antenna ANT#1, the second multiplexer 951-2 transmits a signal output from the second puncturer 941-2 and a signal output from the first puncturer 991-1 through the second transmission antenna ANT#2 after multiplexing, and the third multiplexer 951-3 transmits a signal output from the second puncturer 991-2 through the third transmission antenna ANT#3 after multiplexing. Here, an output signal of the second multiplexer 951-2 will be described. The second multiplexer 951-2 multiplexes second and fourth modulation symbols output from the second puncturer 941-2 with second and fourth modulation symbols output from the first puncturer 991-1, and outputs 4 modulation symbols in series. As a result, the 4 modulation symbols become non-overlapped modulation symbols. Conventionally, since modulation symbols transmitted through an overlapped antenna are also overlapped, when the transmitter applies QPSK as stated above, modulation symbols transmitted through the first transmission antenna ANT#1 and the third transmission antenna ANT#3 are BPSK modulation symbols, whereas modulation symbols transmitted through the second transmission antenna ANT#2 which is the overlapped antenna become QPSK modulation symbols. However, in the present invention, since modulation symbols transmitted through an overlapped antenna, i.e., the second transmission antenna ANT#2, are not overlapped based on the puncturing procedure as described above, modulation symbols transmitted through the overlapped antenna become QPSK modulation symbols. Therefore, the transmitter can transmit symbols having the same constellation size according to transmission antennas.

The invention has been described with reference to a case where puncturing matrixes $P_1$ and $P_2$ are applied to a pair of first and second puncturers 941-1 and 941-2 and a pair of first and second puncturers 991-1 and 991-2, respectively. Next, a description will be made of a case where the 4 puncturers, i.e., the first and second puncturers 941-1 and 941-2 and the first and second puncturers 991-1 and 991-2, are all considered. In this case, puncturing matrixes are given by $$P_3 = \begin{bmatrix} 1 & 1 & 1 & 1 & 1 & 1 & 1 & 1 \\ 1 & 0 & 1 & 0 & 1 & 0 & 1 & 0 \\ 0 & 1 & 0 & 1 & 0 & 1 & 0 & 1 \\ 1 & 1 & 1 & 1 & 1 & 1 & 1 & 1 \end{bmatrix} \quad \text{Equation (4)}$$

$$P_4 = \begin{bmatrix} 1 & 1 & 1 & 0 & 1 & 1 & 1 & 0 \\ 1 & 0 & 1 & 1 & 1 & 0 & 1 & 1 \\ 0 & 1 & 1 & 1 & 0 & 1 & 1 & 1 \\ 1 & 1 & 0 & 1 & 1 & 1 & 0 & 1 \end{bmatrix} \quad \text{Equation (5)}$$

It can be understood from Equation (4) and Equation (5) that the sums of element values of respective columns of a puncturing matrix $P_3$ and a puncturing matrix $P_4$ all become 3. This means that for each column, only 3 of 4 transmission symbols are transmitted at a particular symbol transmission time. First, describing rows of the puncturing matrix $P_3$, a first row is mapped to a first transmission antenna ANT#1, second and third rows are mapped to a second transmission antenna ANT#2, and a fourth row is mapped to a third transmission antenna ANT#3. In the puncturing matrix $P_3$, modulation symbols output from the second puncturer 941-2 and the first puncturer 991-1 are punctured according to elements in the second and third rows. As a result, a non-punctured symbol period is inserted in the mutually punctured symbol period. In the puncturing matrix $P_3$, consideration is taken into not only an overlapped antenna, i.e., the second transmission antenna ANT#2, but also the other remaining transmission antennas, so only one interference component exists.

Second, describing rows of the puncturing pattern $P_4$, a first row is mapped to a first transmission antenna ANT#1, a second row is mapped to the first transmission antenna ANT#1 or a second transmission antenna ANT#2, a third row is mapped to the second transmission antenna ANT#2 or a third transmission antenna ANT#3, and a fourth row is mapped to the third transmission antenna ANT#3. That is, elements of the puncturing matrix $P_4$ are mapped to the transmission antennas according to the following rule.

$$\begin{bmatrix} 1 & 1 & 1 & 0 & 1 & 1 & 1 & 0 \\ 2 & 0 & 2 & 1 & 2 & 0 & 2 & 1 \\ 0 & 2 & 3 & 2 & 0 & 2 & 3 & 2 \\ 3 & 3 & 0 & 3 & 3 & 3 & 0 & 3 \end{bmatrix}$$

The transmission antenna mapping rule specifies how elements of the puncturing matrix $P_4$ should be mapped to the transmission antennas. That is, all elements in a first row of the puncturing matrix $P_4$ must be mapped to the first transmission antenna ANT#1, and elements in a second row of the puncturing matrix $P_4$ must be mapped to the first transmission antenna ANT#1 if the transmission antenna mapping rule is represented by 1, and mapped to the second transmission antenna ANT#2 if the transmission antenna mapping rule is represented by 2. Likewise, elements in a third row of the puncturing matrix $P_4$ must be mapped to the second transmission antenna ANT#2 if the transmission antenna mapping rule is represented by 2, and mapped to the third transmission antenna ANT#3 if the transmission antenna mapping rule is represented by 3. Finally, all elements in a fourth row of the puncturing matrix P4 must be mapped to the third transmission antenna ANT#3. By doing so, it is possible to insert a non-punctured symbol period in a mutually punctured symbol period.

A description will now be made of a trellis structure in the case where the transmitter applies BPSK.

First, a description will be made of a constellation in the case where BPSK is applied.

Figure 12:
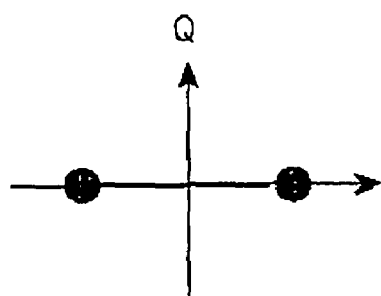
FIG. 12 illustrates a general constellation for BPSK.
Figure 13:
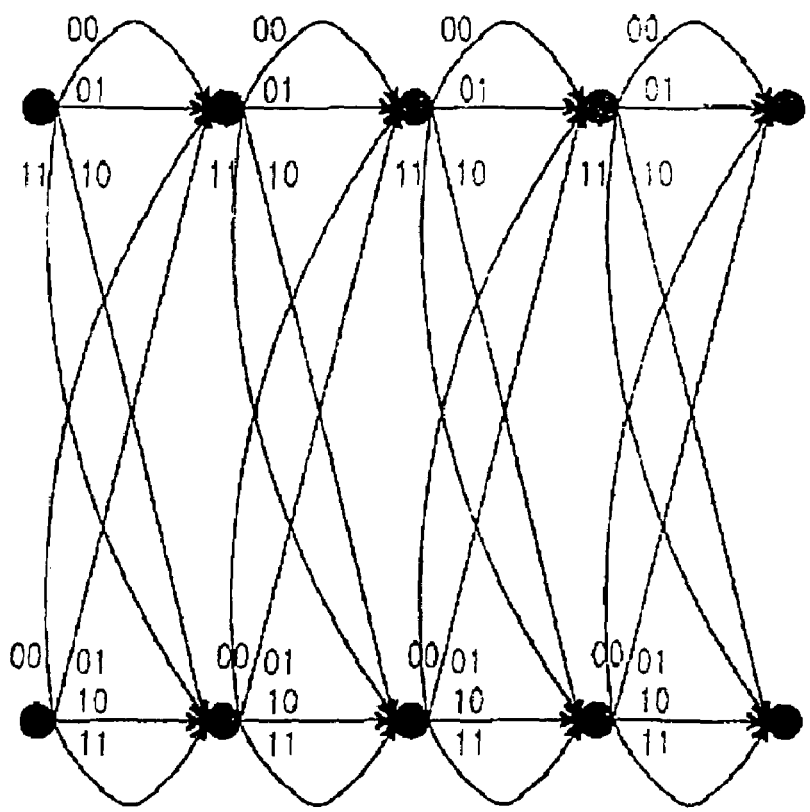
FIG. 13 illustrates a trellis structure based on the overlapped combined array processing and diversity technique.
Figure 14:
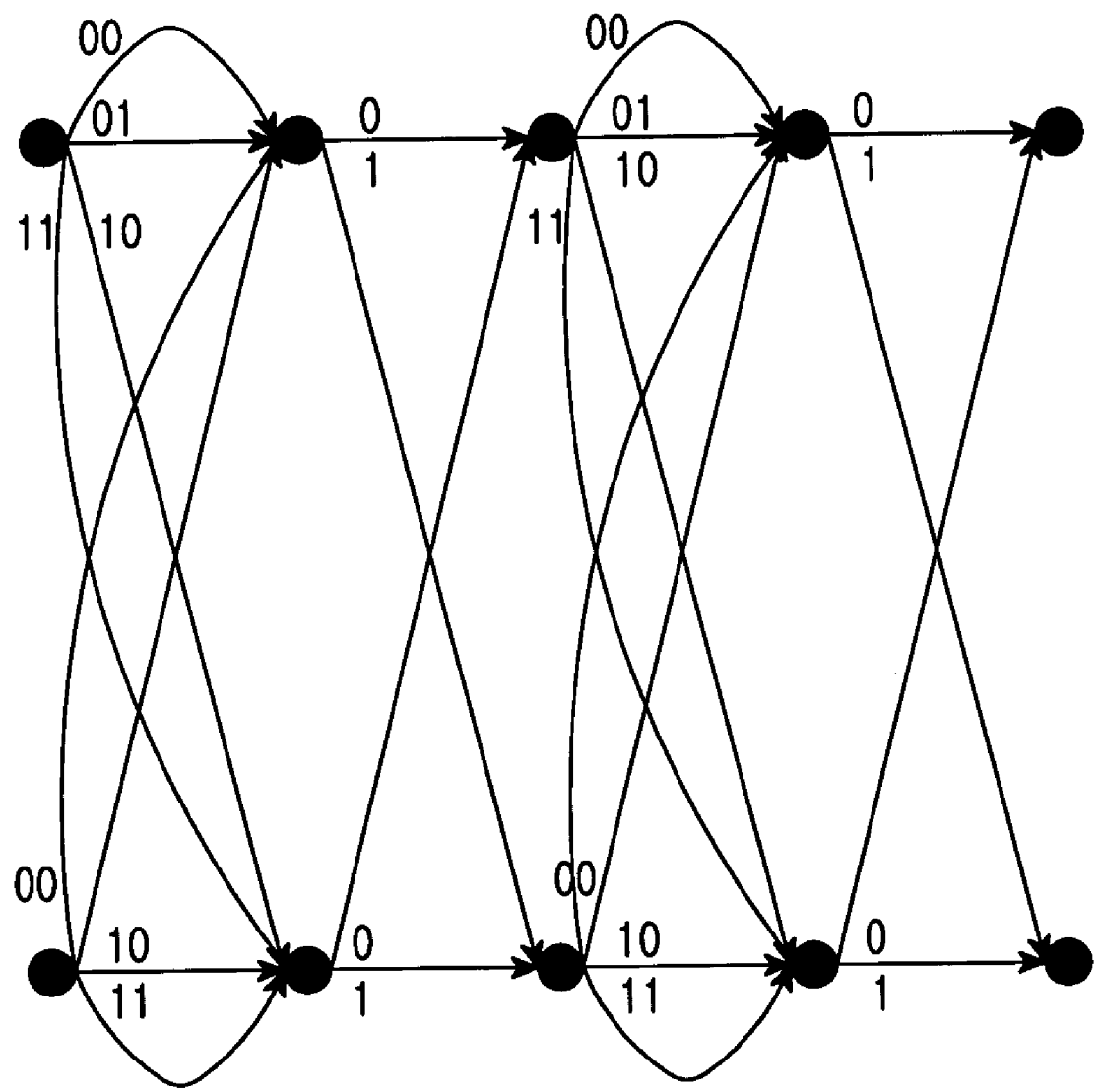
FIG. 14 illustrates a trellis structure according to the present invention.

FIG. 12 illustrates a general constellation for BPSK. As illustrated in FIG. 12, a constellation is shown on a real axis (I) and an imaginary axis (Q). In addition, FIG. 13, as described in the prior art section, illustrates a trellis structure based on the overlapped combined array processing and diversity, and FIG. 14 illustrates a trellis structure according to the present invention. A comparison between FIG. 13 and FIG. 14 will be described. In the trellis structure of FIG. 13, when a received signal is decoded, state transition is considered for all received symbols, i.e., parallel transition is considered. However, in the proposed trellis structure of FIG. 14, parallel transition is not required to be considered, contributing to a reduction in an error rate.

As described above, the present invention eliminates overlapping of signals transmitted via an actual overlapped antenna through a puncturing operation even by using an overlapped antenna technique based on the overlapped combined array processing and diversity technique. Therefore, the present invention achieves both multiplexing gain and diversity gain due to the elimination of overlapping of the transmission signals. In addition, since the transmission signals are not overlapped, a receiver is not required to consider parallel transition when eliminating an interference component, thus minimizing an error rate. Further, since a signal transmitted via an overlapped antenna is not overlapped due to a puncturing operation, the present invention can transmit and receive a signal with the same wireless standard, contributing to a reduction in hardware complexity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for transmitting data in a mobile communication system including at least three transmission antennas of first to third transmission antennas, and using an overlapped antenna scheme for grouping the first and second transmission antennas into a first transmission antenna group and grouping the second and third transmission antennas into a second transmission antenna group, the apparatus comprising:

first and second modulators for receiving L information bit streams to be transmitted through the first transmission antenna group, modulating each of the L information bit streams in a predetermined modulation scheme, and outputting first and second modulated symbol streams;

third and fourth modulators for receiving L other information bit streams to be transmitted through the second transmission antenna group, modulating each of the L information bit streams in the predetermined modulation scheme, and outputting third and fourth modulated symbol streams;

first to fourth puncturers for receiving the first to fourth modulated symbol streams, respectively, and puncturing at least one modulated symbol in a predetermined position among the received first to fourth modulated symbol streams so that an interference component between the second puncturer and the third puncturer is eliminated; and a multiplexer for transmitting a modulated symbol stream output from the first puncturer through the first transmission antenna, transmitting a modulated symbol stream output from the second puncturer and a modulated symbol stream output from the third puncturer through the second transmission antenna after summing up the modulated symbol streams, and transmitting a modulated symbol stream output from the fourth puncturer through the third transmission antenna.

2. The apparatus of claim 1, wherein for the modulated symbol streams output from the first to fourth modulators, the first to fourth puncturers each set the number of punctured modulated symbols to the same number.

3. The apparatus of claim 1, wherein the first to fourth puncturers each set modulated symbol streams output from the first to fourth modulators so that a position where the modulated symbol is punctured is periodically repeated.

4. The apparatus of claim 1, wherein if the number of modulated symbols constituting the modulated symbol stream is 4, the first and second puncturers determine a position where the modulated symbol is punctured according to a puncturing matrix $P_1$ given by $$P_1 = \begin{bmatrix} 1 & 1 & 1 & 1 \\ 1 & 0 & 1 & 0 \end{bmatrix}$$

where a column corresponds to a transmission period, a row corresponds to a transmission antenna, a first row is applied to the first puncturer, and a second row is applied to the second puncturer.

5. The apparatus of claim 4, wherein if the number of modulated symbols constituting the modulated symbol stream is 4, the third and fourth puncturers determine a position where the modulated symbol is punctured according to a puncturing matrix $P_2$ given by $$P_2 = \begin{bmatrix} 1 & 0 & 1 & 0 \\ 1 & 1 & 1 & 1 \end{bmatrix}$$

where a column corresponds to a transmission period, a row corresponds to a transmission antenna, a first row is applied to the third puncturer, and a second row is applied to the fourth puncturer.

6. The apparatus of claim 1, wherein if the number of modulated symbols constituting the modulated symbol stream is 8, the first to fourth puncturers determine a position where the modulated symbol is punctured according to a puncturing matrix $P_3$ given by $$P_3 = \begin{bmatrix} 1 & 1 & 1 & 1 & 1 & 1 & 1 & 1 \\ 1 & 0 & 1 & 0 & 1 & 0 & 1 & 0 \\ 0 & 1 & 0 & 1 & 0 & 1 & 0 & 1 \\ 1 & 1 & 1 & 1 & 1 & 1 & 1 & 1 \end{bmatrix}$$

where a column corresponds to a transmission period, a row corresponds to a transmission antenna, a first row is applied to the first puncturer, a second row is applied to the second puncturer, a third row is applied to the third puncturer, and a fourth row is applied to the fourth puncturer.

7. The apparatus of claim 1, wherein if the number of modulated symbols constituting the modulated symbol stream is 8, the first to fourth puncturers determine a position where the modulated symbol is punctured according to a puncturing matrix $P_4$ given by $$P_4 = \begin{bmatrix} 1 & 1 & 1 & 0 & 1 & 1 & 1 & 0 \\ 1 & 0 & 1 & 1 & 1 & 0 & 1 & 1 \\ 0 & 1 & 1 & 1 & 0 & 1 & 1 & 1 \\ 1 & 1 & 0 & 1 & 1 & 1 & 0 & 1 \end{bmatrix}$$

where a column corresponds to a transmission period, a row corresponds to a transmission antenna, a first row is applied to the first puncturer, a second row is applied to the first puncturer or the second puncturer, a third row is applied to the second puncturer or the third puncturer, a fourth row is applied to the fourth puncturer, and the modulation symbol is punctured in a position of an element '0'.

8. A method for transmitting data in a mobile communication system including at least three transmission antennas of first to third transmission antennas, and using an overlapped antenna scheme for grouping the first and second transmission antennas into a first transmission antenna group and grouping the second and third transmission antennas into a second transmission antenna group, the method comprising the steps of:

receiving L information bit streams to be transmitted through the first transmission antenna group, modulating each of the L information bit streams in a predetermined modulation scheme, and outputting first and second modulated symbol streams;

receiving L other information bit streams to be transmitted through the second transmission antenna group, modulating each of the L information bit streams in the predetermined modulation scheme, and outputting third and fourth symbol modulated streams;

receiving the first to fourth modulated symbol streams, and puncturing at least one modulated symbol in a predetermined position among the received first to fourth modulated symbol streams, and outputting first to fourth punctured modulated symbol streams so that an interference component between the second modulated symbol stream and the third modulated symbol stream is eliminated; and transmitting the first punctured modulated symbol stream through the first transmission antenna, transmitting the second and third punctured modulated symbol streams through the second transmission antenna after summing up the second and third punctured modulated symbol streams, and transmitting the fourth punctured modulated symbol stream through the third transmission antenna.

9. The method of claim 8, wherein for the first to fourth modulated symbol streams, the number of punctured modulated symbols is set to the same number.

10. The method of claim 8, wherein the first to fourth modulated symbol streams are set so that a position where the modulated symbol is punctured is periodically repeated.

11. The method of claim 8, wherein if the number of modulated symbols constituting the modulated symbol stream is 4, a position of the first and second modulated symbol streams where the modulated symbol is punctured is determined according to a puncturing matrix $P_1$ given by $$P_1 = \begin{bmatrix} 1 & 1 & 1 & 1 \\ 1 & 0 & 1 & 0 \end{bmatrix}$$

where a column corresponds to a transmission period, a row corresponds to a transmission antenna, a first row is applied to the first modulated symbol stream, a second row is applied to the second modulated symbol stream, and the modulated symbol is punctured in a position of an element '0'.

12. The method of claim 11, wherein if the number of modulated symbols constituting the modulated symbol stream is 4, a position of the third and fourth modulated symbol streams where the modulated symbol is punctured is determined according to a puncturing matrix $P_2$ given by $$P_2 = \begin{bmatrix} 1 & 0 & 1 & 0 \\ 1 & 1 & 1 & 1 \end{bmatrix}$$

where a column corresponds to a transmission period, a row corresponds to a transmission antenna, a first row is applied to the third modulated symbol stream, a second row is applied to the fourth modulated symbol stream, and the modulated symbol is punctured in a position of an element '0'.

13. The method of claim 8, wherein if the number of modulated symbols constituting the modulated symbol stream is 8, a position of the first to fourth modulated symbol streams where the modulated symbol is punctured is determined according to a puncturing matrix $P_3$ given by $$P_3 = \begin{bmatrix} 1 & 1 & 1 & 1 & 1 & 1 & 1 & 1 \\ 1 & 0 & 1 & 0 & 1 & 0 & 1 & 0 \\ 0 & 1 & 0 & 1 & 0 & 1 & 0 & 1 \\ 1 & 1 & 1 & 1 & 1 & 1 & 1 & 1 \end{bmatrix}$$

where a column corresponds to a transmission period, a row corresponds to a transmission antenna, a first row is applied to the first modulated symbol stream, a second row is applied to the second modulated symbol stream, a third row is applied to the third modulated symbol stream, a fourth row is applied to the fourth modulated symbol stream, and the modulated symbol is punctured in a position of an element '0'.

14. The method of claim 8, wherein if the number of modulated symbols constituting the modulated symbol stream is 8, a position of the first to fourth modulated symbol streams where the modulated symbol is punctured is determined according to a puncturing matrix $P_4$ given by $$P_4 = \begin{bmatrix} 1 & 1 & 1 & 0 & 1 & 1 & 1 & 0 \\ 1 & 0 & 1 & 1 & 1 & 0 & 1 & 1 \\ 0 & 1 & 1 & 1 & 0 & 1 & 1 & 1 \\ 1 & 1 & 0 & 1 & 1 & 1 & 0 & 1 \end{bmatrix}$$

where a column corresponds to a transmission period, a row corresponds to a transmission antenna, a first row is applied to the first modulated symbol stream, a second row is applied to the first modulated symbol stream or the second modulated symbol stream, a third row is applied to the second modulated symbol stream or the third modulated symbol stream, a fourth row is applied to the fourth modulated symbol stream, and the modulated symbol is punctured in a position of an element '0'.

* * * * *